United States Patent [19]
Capell, Sr.

[11] Patent Number: 5,640,369
[45] Date of Patent: Jun. 17, 1997

[54] SIGNAL PROCESSING SYSTEM AND TECHNIQUE FOR CALCULATING ROLL BIAS DATA

[75] Inventor: William Jack Capell, Sr., Westwood, Mass.

[73] Assignee: Sea Beam Instruments Inc., East Walpole, Mass.

[21] Appl. No.: 599,575

[22] Filed: Feb. 9, 1996

Related U.S. Application Data

[62] Division of Ser. No. 460,797, Jun. 2, 1995.
[51] Int. Cl.⁶ ................................................ G01S 15/00
[52] U.S. Cl. ............................................................... 367/88
[58] Field of Search .......................... 367/12, 87, 88, 367/902; 73/597

[56] References Cited

U.S. PATENT DOCUMENTS

| | | | |
|---|---|---|---|
| 5,060,889 | 10/1991 | Nadkarni et al. | 244/183 |
| 5,402,393 | 3/1995 | Konrad | 367/89 |
| 5,465,622 | 11/1995 | Freking | 73/597 |

Primary Examiner—Ian J. Lobo
Attorney, Agent, or Firm—Neil A. Steinberg

[57] ABSTRACT

A method and apparatus for calculating roll bias data which is representative of the differences in attitude between an array of sensors of a sensing system on a vessel and an attitude sensing system on the vessel. The attitude sensing system measures the attitude of the vessel in the roll axis. The technique includes measuring first bathymetric data at a first locale at time $t_1$ using a first beam projected at the first locale at a substantially 45° angle from the vertical of the array; measuring second bathymetric data at the first locale at a time $t_2$ using a second beam projected at substantially the same angle from the vertical of the array as the first beam from the opposite side of the vessel; and calculating roll bias data by comparing the first and second bathymetric data at the first locale. The roll bias data may be used to further calculate a roll bias correction factor. The signal processing apparatus employs the roll bias data and/or roll bias correction factor to compensate, reduce or eliminate erroneous bathymetric data caused by differences in attitude between the array of sensors of the sensing system on the vessel and the attitude sensing system.

25 Claims, 12 Drawing Sheets

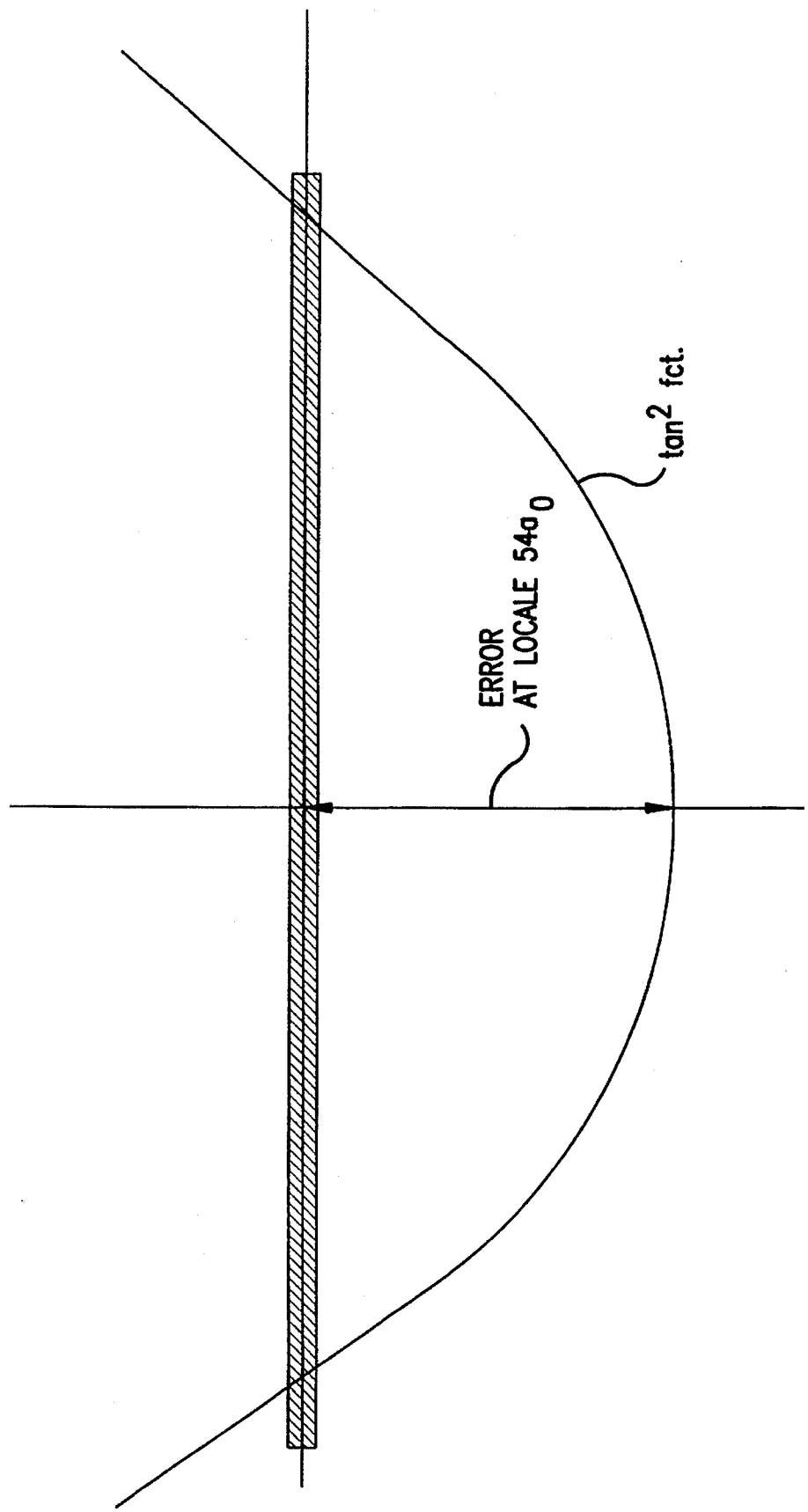

SIGNAL PROCESSING SYSTEM AND TECHNIQUE FOR CALCULATING ROLL BIAS DATA

This is a division of application Ser. No. 08/460,797 filed on Jun. 2, 1995, pending.

BACKGROUND OF THE INVENTION

This invention relates to systems and techniques involving signal processing in single or multibeam sensing systems, and, more particularly, to systems and techniques involving signal processing of receive signals in single or multibeam sonar systems.

Briefly, by way of background, a sonar system may be used to detect, navigate, track, classify and locate objects in water using sound waves. Defense and civilian applications of sonar systems are numerous. In military applications, underwater sound is used for depth sounding; navigation; ship and submarine detection, ranging, and tracking (passively and actively); underwater communications; guidance and control of torpedoes and other weapons; and mine detection. Most systems are monostatic, but bistatic systems may also be employed.

Civilian applications of underwater sound detection systems are numerous as well. These applications are continuing to increase as attention is focused on the hydrosphere, the ocean bottom, and the sub-bottom. Civilian applications include depth sounding (bathymetry); bottom topographic mapping; object location; underwater beacons (pingers); wave-height measurement; doppler navigation; fish finding; sub-bottom profiling; underwater imaging for inspection purposes; buried-pipeline location; underwater telemetry and control; diver communications; ship handling and docking aid; anti-stranding alert for ships; current flow measurement; and vessel velocity measurement.

A typical active sonar system includes a transmitter (a transducer commonly referred to as a "source" or "projector") to generate the sound waves and a receiver (a transducer commonly referred to as a "hydrophone") to sense and measure the properties of the reflected energy ("echo") including, for example, amplitude an phase. In a typical multibeam sonar system, a first transducer array ("transmitter or projector array") is mounted along the keel of a ship and radiates sound. A second transducer array ("receiver or hydrophone array") is mounted perpendicular to the transmitter array. The receiver array receives the "echoes" of the transmitted sound pulse, i.e., returns of the sound waves generated by the transmitter array. Thus, typically, in a sonar system a short burst of energy is generated by the transmitter array, travels to the target, is reflected, and returns to the receiver array which measures the return signal. A conventional sonar system and transmitter and receiver array configuration is disclosed in Lustig et al., U.S. Pat No. 3,114,631.

An important consideration in the operation of sonar systems is the ability to control, compensate or reduce sources of errors when, for example, employing the system in such applications as depth sounding, bottom topographic mapping, object location, fish finding, sub-bottom profiling, underwater imaging for inspection purposes, and buried-pipeline location. One significant source of error stems from inaccurate sound velocity data. The speed at which sound travels through water changes according to a particular geographic location and time of day. That is, the velocity of sound varies at a given location according to temperature, salinity, and pressure or depth.

Typically in littoral areas, however, the sound velocity profile is a dominate source of error. Littoral areas experience large variations in the velocity of sound which are difficult to measure reduce, or control. Littoral waters tend to include a significant number of "fresh" water outlets/channels and encounter large variations in water temperature. Errors in the sound velocity profile often prevents the use of a very wide swath sonar systems.

Conventional techniques for monitoring the sound velocity profile and minimizing errors created by incorrect sound velocity profile data require a high volume use of velocity profilers and expendable bathythermographs (XBTs). These techniques can be both time consuming and costly as well as presenting logistical concerns. In this regard, a line or array of velocity profilers (thermistors) is coupled to the hull of the ship and hauled during sonar data collection. This manner of sound velocity profile correction limits the velocity at which the ship may travel which, in turn, limits the rate of sonar data collection because the array of velocity profiles should suspend "vertically" in order to provide an accurate correlation between the position of each profiler and its "calculated" absolute depth.

Moreover, employing velocity profilers also presents another disadvantage in that there exists a significant risk in damaging the velocity profiler array as the array is dragged during data collection. In this regard, the velocity profiler array may get damaged on an undiscovered "outcrop" or sea mount as the ship traverses the ocean, for example, during bottom topographic mapping in littoral regions.

Use of XBTs presents an additional concern in that these devices presume that the salinity of the water is known and somewhat fixed. In littoral areas, for example, the salinity may not be known because littoral regions tend to include a large number of fresh water outlets.

The importance of accurate sound velocity data may be illustrated via the following example. The velocity of sound (i.e. velocity of propagation) in sea water typically is within the range of 4700 to 5100 feet per second. In simply measuring the distance to a target, the sound velocity has a significant effect upon the "actual" distance to the target. The time between the instant when the sound leaves and the echo returns (Echo Time) is a measure of distance to the target (i.e., the target range). In general, the distance or range to a target is:

$$\text{Range} = \tfrac{1}{2} * \text{Velocity of Sound} * \text{Echo Time}$$

Thus, employing this equation, if the echo time is 10 seconds and the velocity of sound is approximated at 4,800 feet per second, then the distance to the target is 24,000 feet. However, depending upon the temperature, salinity, and pressure or depth of the water, this distance may vary between 23,500 to 25,500 feet. Thus, small changes in the velocity have a significant impact on the operation of a sonar system and the accuracy of the data generated thereby.

Another dominant error source which prevents the use of a very wide swath sonar systems in littoral waters is roll bias error. Roll bias error is the difference in the attitude between the sonar arrays and the hull of the ship. Roll bias error is typically caused by misalignment of the sonar array during installation or by sensor drift. A roll bias error tends to result in, for example, inaccurate bathymetry data.

Presently, vertical reference data source (e.g. multi-axis accelerometer units) are insufficient to provide adequate data to significantly reduce such errors. Although this is expected to change in the near future and improved vertical reference data sources should reduce or correct errors caused by roll bias, such devices are expensive and add to the complexity of the overall sonar system. That is, the next "generation" of multi-axis accelerometer units should improve the considerations for all roll related errors, including roll, heave and pitch biases but the cost and the increase in complexity of implementing such devices in sonar systems may present a concern.

As a result, there exists a need for a sonar system having a signal processing system and technique which compensates, reduces or eliminates, in situ errors in the measured sonar data resulting from inaccurate sound velocity data and/or roll bias error to thereby increase the accuracy in depth sounding, bottom topographic mapping, object location, sub-bottom profiling, underwater imaging for inspection purposes, and buried-pipeline location applications. In particular, there exists a need for a signal processing system and technique to provide an accurate sound velocity profile to compensate, reduce or eliminate the impact of geographic and temporal variations that the velocity of sound have on a sonar system. Further, there exists a need for a sonar system that minimizes bathymetry errors created by incorrect sound velocity profile data which change throughout the day from one locale to another, especially in littoral zones.

Moreover, there exists a need for a signal processing system for a sonar system that compensates, reduces or eliminates roll bias errors resulting from improper alignment of the sonar arrays relative to the ship's hull. There exists a need for a sonar system which minimizes bathymetry errors created by differences in the attitude between the sonar arrays and the hull of the ship which prevent the use of wide swath arrays, especially in littoral zones.

SUMMARY OF THE INVENTION

In a first principal aspect, the present invention is a method and apparatus for calculating a sound velocity and/or sound velocity error in an ocean, gulf, sea, bay, littoral region, lake, or river at a first locale using a sensing system (for example, a sonar system) having at least one sensor. The method includes measuring echo time data of a first sounding which is projected in the direction of the first locale at a first angle and calculating bathymetric data for the first locale using the echo time data of the first sounding and a first estimated sound velocity. The method further includes measuring echo time data of a second sounding which is projected in the direction of the first locale at a second angle and calculating bathymetric data for the first locale using echo time data of the second sounding and a second estimated sound velocity. The sound velocity and/or sound velocity error at the first locale is calculated using bathymetric data and echo time data of the first sounding and bathymetric data and echo time data of the second sounding.

In one preferred embodiment, the method includes calculating a sound velocity profile correction factor using a curve fit of a $\tan^2$ function and the sound velocity error. In this embodiment, the second sounding may be projected at the second angle which is at a substantially 0° angle from the vertical axis of the sensor and the sound velocity error is calculated using the echo time of the second sounding and the bathymetric data for the first locale measured by the first sounding. The sound velocity profile correction factor, in this embodiment, is calculated using a curve fit of a $\tan^2$ function having a magnitude substantially equal or proportional to the sound velocity error.

In another principal aspect, the present invention is a method and apparatus for calculating a velocity of sound in an ocean, gulf, sea, bay, littoral region, lake, or river at a first locale using a sensing system having at least one sensor. The technique includes calculating bathymetric data for the first locale using a first sounding which is projected in the direction of the first locale at a substantially 45° angle from the vertical axis of the sensor. The technique also includes calculating an echo time of a second sounding which is projected in the direction of the first locale. The sound velocity at the first locale is calculated using the echo time of the second sounding and the bathymetric data for the first sounding.

In a preferred embodiment, the method further includes calculating a sound velocity error of the sound velocity at the first locale using the echo time of the second sounding and the bathymetric data for be first sounding where he second sounding is projected at a substantially 0° angle from the vertical axis of the sensor. In this embodiment, a sound velocity profile correction factor may be computed using a curve fit of a $\tan^2$ function having a magnitude substantially equal to the sound velocity error. The sound velocity profile correction factor may be employed to correct bathymetric data.

In yet another aspect, the present invention is a method and apparatus for calculating sound velocity data in a medium using a sensing system having an array of sensors coupled to a hull of a vessel. The technique includes transmitting a first beam at a first locale, measuring a receive signal of the first beam, computing an echo time of the first beam, and computing a first sound velocity at the first locale using the echo time of the first beam and bathymetric data for the first locale measured by a beam which is transmitted in the direction of the first locale at a substantially 45° angle from the vertical axis of the array. The method also includes transmitting a second beam at a second locale, measuring a receive signal of the second beam, computing an echo time of the second beam, and computing a second sound velocity at the second locale using the echo time of the second beam and bathymetric data for the second locale measured by a beam which is transmitted in the direction of the second locale at a substantially 45° angle from the vertical axis of the In one embodiment, the bathymetric data for the first locale may be calculated using a first sounding and a third sounding, the bathymetric data for the second locale may be calculated using a second sounding and a fourth sounding. In addition, the first sound velocity may be calculated using the first and the third sounding, and the second sound velocity may be calculated using the second and the fourth sounding. In this embodiment, the first locale is situated in a first sounding strip and the second locale is situated in a second sounding strip.

In a preferred embodiment of this aspect of the invention, the method further includes calculating a first sound velocity profile correction factor of the first sounding strip using the first sound velocity and calculating a second sound velocity profile correction factor of the second sounding strip using the second sound velocity. In another preferred embodiment, the method includes correcting bathymetric data for a plurality of locales situated in the first sounding strip in accordance with the first sound velocity profile correction factor and correcting bathymetric data for a plurality of locales situated in the second sounding strip in accordance with the second sound velocity profile correction factor.

The method may also include the steps of computing a sound velocity error of the sound velocity at the first locale using the echo time of the first beam, bathymetric data for the first locale measured by the beam projected at the first locale at an angle of substantially 45° from the vertical axis of the array, and a surface sound velocity at the array. A sound velocity profile correction factor of the first sounding strip may be derived wherein the sound velocity profile correction factor is a curve fit of a $\tan^2$ function having a magnitude substantially equal or proportional to the sound velocity error. In this embodiment, the bathymetric data measured for a plurality of locales situated in the first sounding strip may be corrected in accordance with the sound velocity profile correction factor.

In yet another principal aspect, the present invention is a method of calculating errors in sound velocity data in an ocean, gulf, sea, bay, littoral region, lake, or river using a sensing system having an array of sensors horizontally mounted a hull of a vessel. The method includes projecting a first beam at a first locale situated in a first sounding strip at a substantially 0° angle from the vertical axis of the array. The method also includes measuring a receive signal of the first beam, computing an echo time of the first beam and computing a first sound velocity error of the sound velocity at the first locale using the echo time of the first beam and bathymetric data for the first locale. The bathymetric data for the first locale is measured by a beam which is projected at the first locale at a substantially 45° angle from the vertical axis of the array.

The method may further include the step of calculating a sound velocity profile correction factor of the first sounding strip wherein the sound velocity profile correction factor is a curve fit of a $\tan^2$ function having a magnitude substantially equal to the first sound velocity error. In a preferred embodiment, the bathymetric data measured for a plurality of locales situated in the first sounding strip may be corrected in accordance with the first sound velocity profile correction factor.

The method of this aspect of the invention may further include projecting a second beam at a substantially 0° angle from the vertical axis of the array in the direction of a second locale which is situated in a second sounding strip, measuring a receive signal of the second beam, computing an echo time of the second beam, and computing a second sound velocity error of the sound velocity at the second locale using the echo time of the second beam and bathymetric data for the second locale measured by a beam which is transmitted at a substantially 45° angle from the vertical axis of the array. In a preferred embodiment, a sound velocity profile correction factor is calculated for each of the first and second sounding strips wherein the sound velocity profile correction factor for the first and second sounding strips is a curve fit of a $\tan^2$ function having a magnitude substantially equal or proportional to the first and second sound velocity errors, respectively A sound velocity profile correction gradient may be calculated using the first sound velocity profile correction factor of the first sounding strip and the second sound velocity profile correction factor of the second sounding strip. The sound velocity profile correction gradient is representative of values of a sound velocity profile correction factor for a plurality of locales in a plurality of sounding strips contiguous to and/or position between the first and second sounding strips. In a preferred embodiment, bathymetric data measured for a plurality of locales situated in the plurality of sounding strip may be corrected in accordance sound velocity profile correction gradient. In another principal aspect, the present invention is a method and apparatus of calculating roll bias data which is representative of the differences in attitude between an array of sensors of a sensing system on a vessel and an attitude sensing system which measures the attitude of the vessel in the roll axis. The method includes measuring first bathymetric data at a first locale at time t using a first beam projected at the first locale at a substantially 45° angle from the vertical of the array and measuring second bathymetric data at the first locale at a time $t_2$ using a second beam projected at the same angle from the vertical of the array as the first beam from the opposite side of the vessel. The roll bias data is computed by comparing the first and second bathymetric data at the first locale.

In a preferred embodiment, the method and apparatus of calculating roll bias data further includes subtracting difference in the tide in the immediate vicinity of the first locale between time $t_1$ and time $t_2$. In another preferred embodiment, the method includes calculating the difference in the tide at a second locale by measuring bathymetric data at a second locale at about time $t_1$ using a first beam projected at a substantially 45° angle from the vertical of the array and measuring bathymetric data at the second locale at about time t using a second beam projected from the same side of the vessel at the same angle from the vertical of the array as the first beam wherein the second locale is in the immediate vicinity and on the same sounding strip as the first locale.

In yet another preferred embodiment, the method further includes calculating the difference in the tide at a third locale by measuring bathymetric data at the third locale at time $t_3$ using a first beam projected at a substantially 45° angle vertical of the array. The method also includes measuring bathymetric data at the third locale at time $t_4$ using a second beam projected from the same side of the vessel at the same angle from the vertical of the array as the first beam wherein the second locale is in a different sounding strip as the first locale. The difference in the tide at a first locale may be an average of the difference in the tide at the second and third locales.

Finally, in another principal aspect, the present invention is a method and apparatus of calculating roll bias data which is representative of the differences in attitude between an array of sensors of a sensing system on a vessel and an attitude sensing system which measures the attitude of the vessel in the roll axis. The method includes measuring first bathymetric data at a first locale at time $t_1$ using a first beam projected at the first locale at a first angle, measuring second bathymetric data at the first locale at a time $t_2$ using a second beam projected from the opposite side of the vessel at the first locale at the first angle, and calculating roll bias data by comparing the first and second bathymetric data.

BRIEF DESCRIPTION OF THE DRAWINGS

The novel features believed characteristic of the invention are set forth in the claims. The invention, as well as features and advantages thereof, will be understood by reference to the detailed description which follows, read in conjunction with the accompanying drawings, in which:

FIG. 10 is an illustration of a curve fit of the depth error profile in a preferred embodiment.

DETAILED DESCRIPTION

Figure 1:
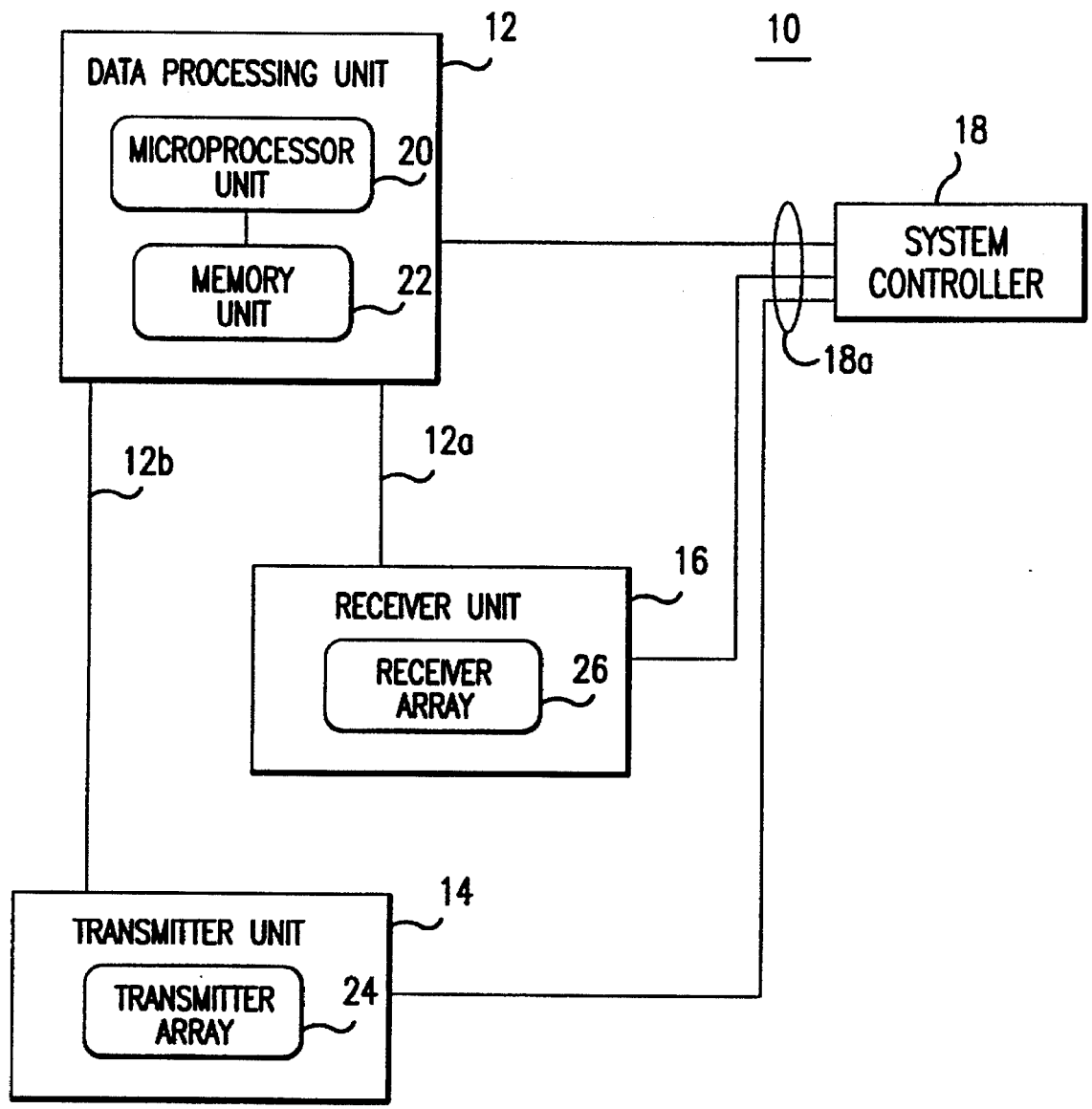
FIG. 1 is a schematic block diagram representation of a sonar system including a signal processing system according to the present invention.

The present invention is a signal processing system and technique for use in active and passive single and multibeam sensing systems, for example, multibeam sonar systems. The present invention is described below in the environment of an active multibeam sonar system having an array of sensors coupled to a hull of a vessel.

The signal processing system and technique of the present invention reduce, compensate and/or minimize, in situ, bathymetric errors due to inaccurate sound velocity data and roll bias error. The signal processing system reduces or minimizes errors in measured or calculated bathymetric data resulting from use of inaccurate sound velocity data of the ocean, gulf, sea, bay, littoral region, lake, river, or the like (i.e. medium). In addition, the signal processing system reduces or minimizes errors in measured or calculated bathymetric data caused by an unaligned, improper aligned, or out-of-aligned array of a sonar system. It should be noted that bathymetric data is information relating to or representative of the depth of the ocean, gulf, sea, bay, littoral region, lake, river, or the like.

In one embodiment, the signal processing technique and system compensate or reduce errors in an estimated velocity of sound in an ocean, gulf, sea, bay, littoral region, lake, river or the like at a specific locale using bathymetric data for that location determined by a reference beam. The reference beam is a beam which is projected at a substantially 45° angle from the vertical axis of the transmitter array. This reference beam experiences relatively small errors in depth as a result of nominal changes in sound velocity.

A beam projected at a substantially 45° angle from the vertical axis of the transmitter array may be a beam having an angle of projection which provides tolerable error in bathymetric or sound velocity data as a result of nominal changes in sound velocity through a medium at a locale based on, for example, temperature, salinity and pressure or depth. A substantially 45° angle from the vertical axis of the transmitter array may be in the range of 40° to 50° and preferably between 42° and 48° from the vertical axis of the transmitter array.

In this embodiment, the sound velocity of the locale (geographic location) is calculated, for a particular time and date, using the echo time of a sounding at that locale and the bathymetric data that is measured by the reference beam (beam projected at a substantially 45° angle from the vertical axis of the array). In a preferred embodiment, the sound velocity at the locale, at the time and date of the sounding, is calculated using:

Velocity of Sound=(2*Bathymetric Data)/Echo Time

The reference beam provides the data processing system with information representing the depth of the medium (e.g., ocean or lake) at that specific location. The system employs that depth information as a reference for the second measurement taken by a second sounding to calculate the sound velocity of the medium at the time and date of the second sounding. As mentioned above, the sound velocity of the medium may change depending on temperature, salinity, and pressure or depth of the medium.

The technique and system of the present invention allows a sound velocity profile of a sounding strip in the medium to be calculated using the sound velocity data determined for a locale. That locale may be one of a plurality of locales in the sounding strip. The sound velocity profile for the sounding strip may then be employed to correct, minimize or reduce errors in bathymetric data for the plurality of locales on the sounding strip which are caused by inaccurate sound velocity information.

A sound velocity profile may be calculated for a plurality of sounding strips in a similar manner. The signal processing technique and system according to the present invention may employ sound velocity profiles to calculate a sound velocity gradient. The sound velocity gradient allows the correction of bathymetric data for locations within the sound velocity gradient and/or for sounding strips whose sound velocity profile have not been determined.

The technique and system of the present invention may also calculate an error in sound velocity at a locale. The sound velocity error is determined in a manner similar to that described above for the sound velocity. Here, the sound velocity error at the locale, for a given time and date, is calculated using the echo time of a sounding at that locale and the bathymetric data for that locale which is measured by a reference beam (beam projected at a substantially 45° angle from the vertical axis of the array). The error may be represented as sound velocity depth related errors.

The signal processing system and technique may calculate a sound velocity error profile for the sounding strip using the sound velocity error determined for a locale which is located in a sounding strip. The first sounding strip includes a plurality of locales.

Further, a sound velocity error gradient may also be calculated using a plurality of sound velocity error profiles. The sound velocity error profile gradient may then be employed to correct bathymetric data for sounding strips whose sound velocity profile has not been determined.

In some instances, the surface sound velocity contributes significantly to the error in bathymetric, measurements due to sound velocity errors. The surface sound velocity is the velocity of propagation of sound at the surface of the receiver array 24. For example, when employing a sonar array having a mounting which is not parallel to the earth's horizontal plane (FIG. 3A), surface sound velocity should either be known or measured (for example, by a surface sound velocity sensor typically referred to as sound velocimeter).

It should be noted, however, that under the circumstances of a horizontally mounted hydrophone array, the sound velocity related depth errors are insensitive to sound velocity errors in surface layer (surface sound velocity errors). As a result, in sonar systems having a hydrophone array which is mounted in horizontal configuration (FIG. 3B), there are substantially no errors in the sound velocity attributable to the surface layer (i.e. that layer which is at the surface of the receiver array 24).

The technique and system of the present invention may also calculate the sound velocity at a first locale using: (1) bathymetric data and echo time data for a first sounding projected in the direction of the first locale and (2) bathymetric data and echo time data for a second sounding projected in the direction of that same locale. In this embodiment, the angle of projection of the "reference beam", relative to the vertical, need not be 45°; rather, any angle of projection ma be employed (with the constraint being that the projection angle should be selected such that a return signal (echo) is measured or received by the receiver array 26). The sound velocity is determined using the bathymetric data and the echo time data calculated or measured from each of the soundings, as will be described in detail below. In this embodiment, a surface sound velocity which is unknown or non-zero may contribute to an error in the calculated sound velocity. However, as mentioned above, where the array is a horizontal array, the surface sound velocity related depth errors are insensitive to sound velocity errors in surface layer; and, as a result, there are essentially no errors in the sound velocity attributable to the surface layer.

As indicated above, a sound velocity profile of a sounding strip in the medium may be calculated using the sound velocity data determined for the first locale. The first locale is one of a plurality of locales in the sounding strip. The sound velocity profile for the sounding strip may then be employed to correct, minimize or reduce errors in bathymetric data for the plurality of locales on the sounding strip due to inaccurate sound velocity data employed in calculating the bathymetric information.

In addition, a sound velocity profile may be calculated for a plurality of sounding strips. The signal processing unit may employ the sound velocity profiles to calculate a sound velocity gradient. The sound velocity gradient may be used to correct bathymetric data for locations within the sound velocity gradient and/or for sounding strips whose sound velocity profile have not been determined.

With reference to FIG. 1, a sonar system 10 according to the present invention includes a data processing unit 12, a transmitter unit 14, a receiver unit 16, and a system controller 18. The data processing unit 12 includes a microprocessor unit 20 and a memory unit 22. The data processing unit 12 employs the microprocessor unit 20, in conjunction with the memory unit 22, to acquire data which can be used to implement the technique of the present invention. Further, the microprocessor unit 20 can process the data from the receiver unit 16 which is stored in memory unit 22 in accordance with the processing techniques discussed below. The memory unit 22 stores programs to be executed by the microprocessor unit 20 as well as the received and processed hydrophone data. Additionally, data may be processed according to the present invention in a stand-alone data processing unit once the data is transferred from the memory unit 22 to the stand-alone data processing unit.

The sonar system 10 employs the system controller 1 as a user interface between the user and the various elements of the sonar system 10. The user controls all aspects of the system 10 through the system controller 18. The system controller 18 may include a display (not shown), an input device (keyboard and/or pointing device), and other control and/or interface mechanisms for the various elements of the system 10. The system controller 18 is electrically coupled to the data processing unit 12, transmitter unit 14 and receiver unit 16 through multi-wire bus 18a.

Figure 2:
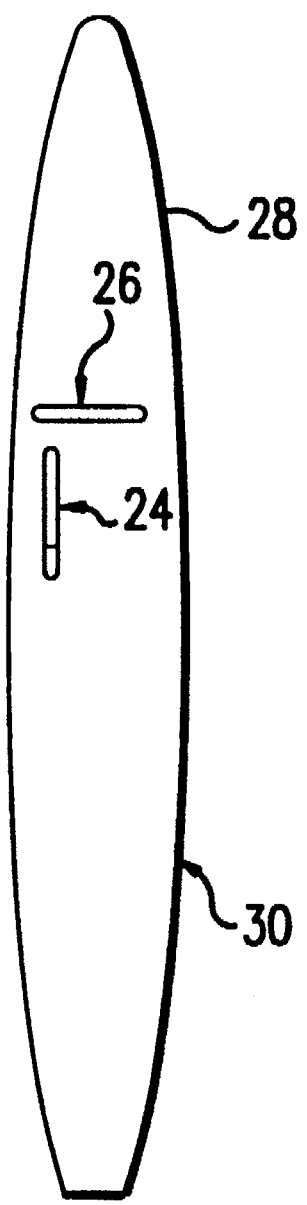
FIG. 2 is a plan view illustration of a typical location of the transmit and receiver arrays on the hull of the ship in one configuration of a multibeam sonar system.

Briefly, the sonar system 10 employs the transmitter unit 14 to generate and transmit sound waves (energy) into the water. The transmitter unit 24 includes a transmitter array 24. The transmitter array 24 includes a plurality of individual transmitter elements (generators) for generating and transmitting energy. With reference to FIG. 2, the transmitter array 24 may be placed on the bottom of the hull 28 of ship 30. As illustrated, the transmitter array 24 may be aligned parallel to the longitudinal axis of the ship 30.

With reference to FIG. 1, the receiver unit 16 is employed to sense the return echo. The receiver unit 16 demodulates and processes the measured reflected energy so that the data processing unit 12 may perform further processing. The receiver unit 16 includes a receiver array 26. The receiver array 26 includes a plurality of hydrophones to sense and measure the properties of the reflected energy (return echo) including, for example, magnitude and phase. The receiver unit 16, including its sensing elements, is discussed in more detail below.

It should be noted that although the transmitter and receiver arrays are described herein as physically separate arrays, they may be the incorporated into the same physical unit. That is, the transmitter and receiver arrays may be combined into a transmitter/receiver array which performs the functions of both the transmitter array and the receiver array.

With reference to FIG. 2, the receiver array 26 may be mounted on the hull 28 in a lateral configuration relative to the longitudinal axis of the ship 30. The location of the receiver array 26 is somewhat determined by several guidelines, including: (1) placement of the receiver array 26 far enough to the center of the ship 30 to permit the use of a large array, and (2) placement of the receiver array 26 far enough forward to avoid excessive noise from the propulsion system (not shown) of the ship 30.

Figure 3A:
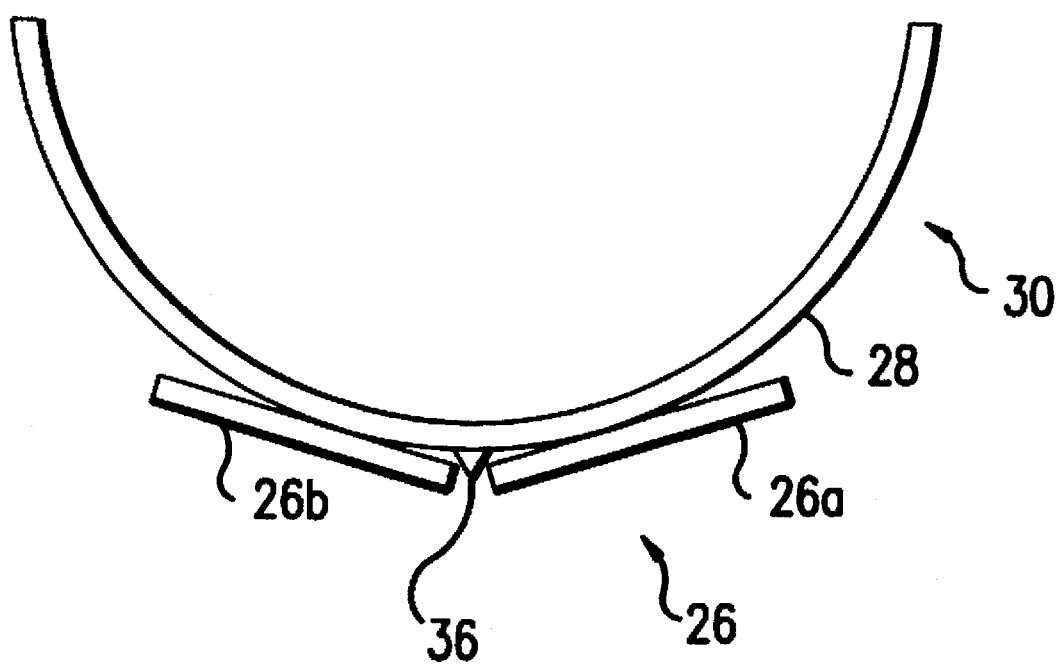
FIGS. 3A and 3B are cross sectional views depicting various mounting configurations of the receiver array of a multibeam sonar system on the hull of a ship.

With reference to FIG. 3A, the receiver array 26 may be configured on the "broadside" of the exterior of the hull 28 of the ship 30. The receiver array 26 illustrated in FIG. 3A is a "broadside" array in the sense that the elements of the receiver array 26 are positioned on the broadside of the hull 28 of the ship 30. Further the receiver array 2 is illustrated as segmented into two sub-arrays with keel 36 in between.

Figure 3B:
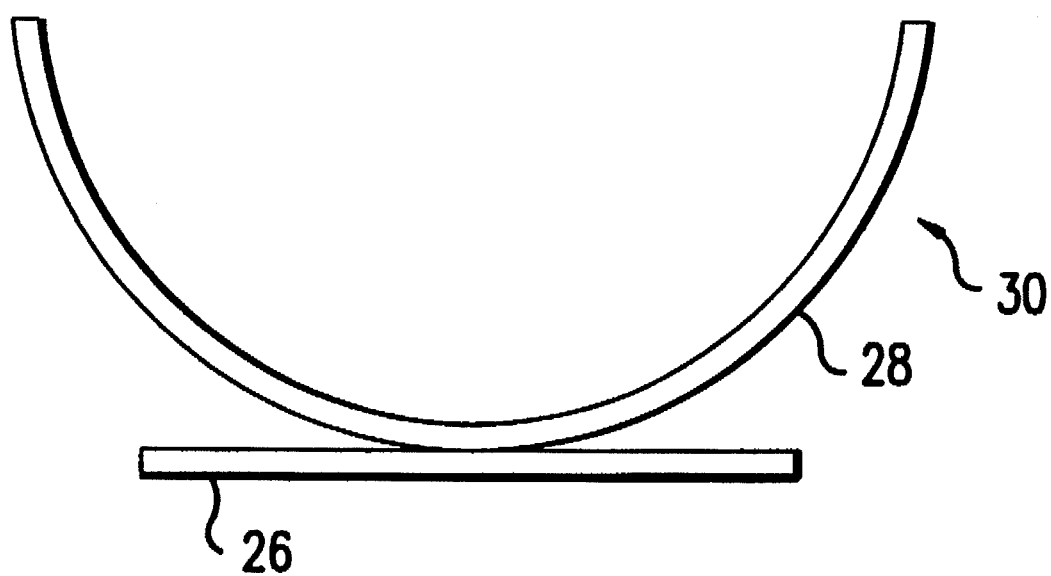

With reference to FIG. 3B, the receiver array 26 is mounted to the hull 28 of the ship 30 in a horizontal configuration. The receiver array 26 is mounted such that it lies in a plane horizontal to the earth's horizontal plane.

It should be noted that although FIGS. 3A and 3B illustrate two mounting configurations of receiver array 26, it will be appreciated by those skilled in the art that other mounting configurations for receiver array 26 exist and/or may be employed in practicing the present invention. For example, in FIG. 3A, the receiver array 26 is illustrated as mounted to both the port and starboard sides of the ship 30. The receiver array 26, in some instances, need not be mounted on both sides of the ship 30; rather, the receiver array 26 may be placed (mounted) on either the port or starboard side of ship 30.

Further, the receiver array 26 of FIG. 3B illustrates a horizontal mounting of the receiver array 26. The length of the array 26 may vary to accommodate the use to which the sonar system 10 is to be employed.

Figure 4:
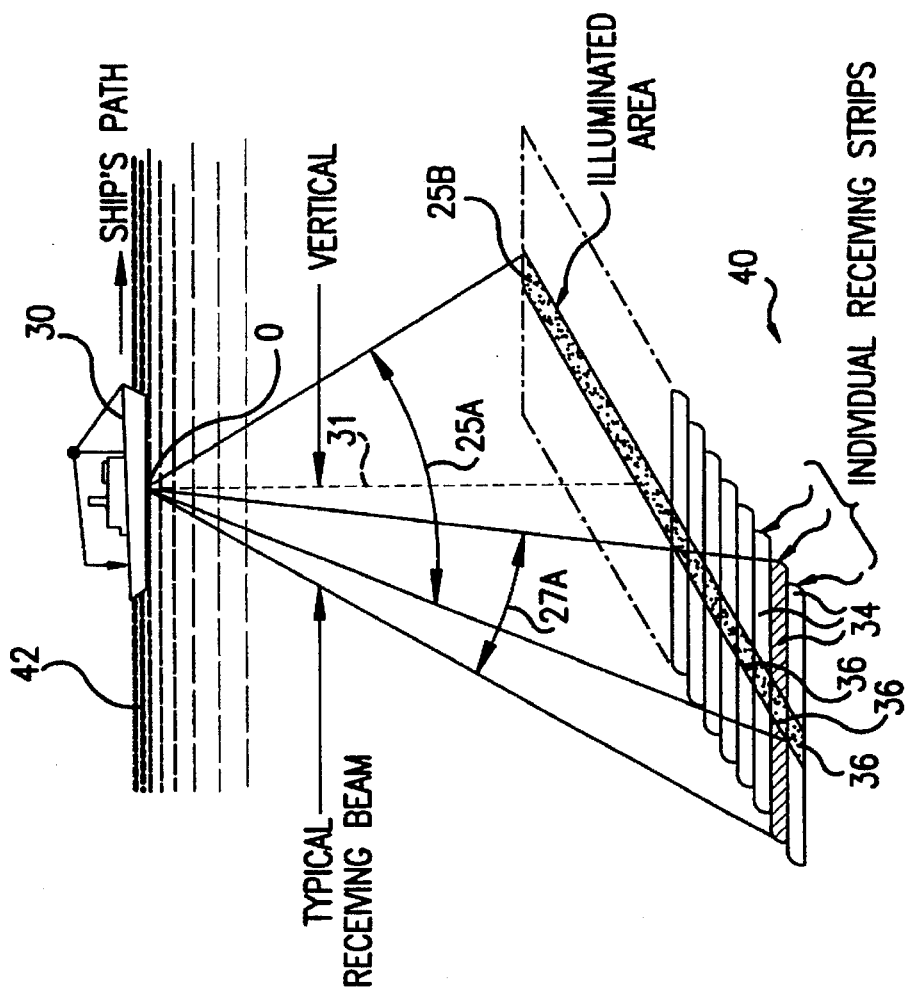
FIG. 4 is a diagrammatic perspective view of the orientation of the respective transmitting and receiving beams.
Figure 5:
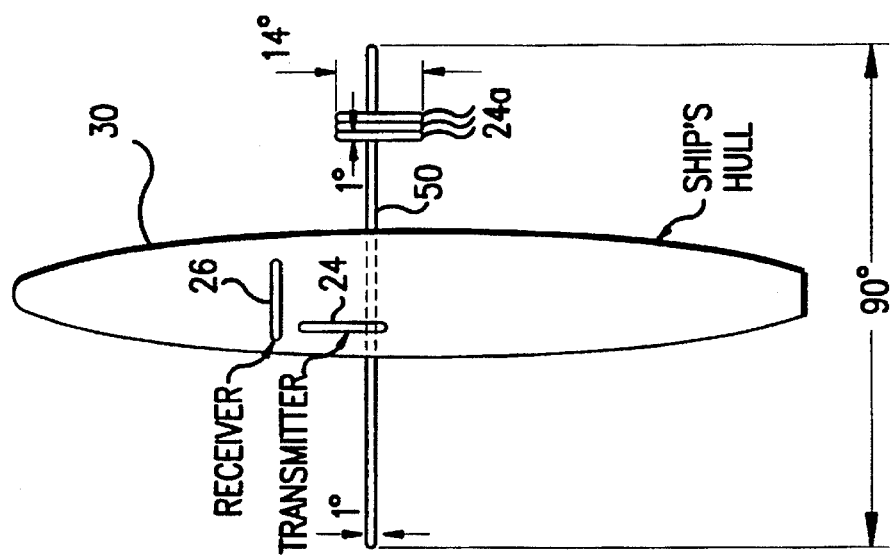
FIG. 5 is a diagrammatic plan view illustrating a typical location of the transmitting and receiver arrays on the hull of a ship and also illustrating the location relative thereto of the areas on the sea bottom covered by the transmitted beam and a sample of the receiving beams.

FIGS. 4 and 5 illustrate one manner of bottom topographic mapping or bathymetric mapping wherein the sonar energy emanating from the ship 30 is transmitted in the form of a thin fan beam 25A lying in a substantially vertical plane perpendicular to the heading of the ship 30. This beam may be 90° wide, may be about 1° thick, and illuminates a long narrow area of the ocean floor 40 substantially perpendicular to the ship's heading. An axis vertical to the ship 30 is illustrated in a dotted line 31.

As the ship progresses, this illuminated strip "sweeps" out into an area determined somewhat by the direction of movement of the ship 30. To form the transmitting beam, transmitter array 24 may be located on the ship's hull 28 at a position such as illustrated in FIG. 5, and may be composed of a plurality of individual elements arranged longitudinal on the hull 28 as illustrated.

A plurality of individual fan-shaped receiving beams, generally designated 34, are employed for receiving transmitted radiation which is reflected from the sea bottom or other terrain being mapped or measured. The planes of these beams are oriented substantially perpendicular to the transmitted beam 25A. That is, these beams are narrow widthwise of the ship 30 and long in the fore-and-aft direction of the ship 30. The beams 34 sight adjacent areas on the sea bottom, the area intersecting the area 25B at 36.

Figure 6:
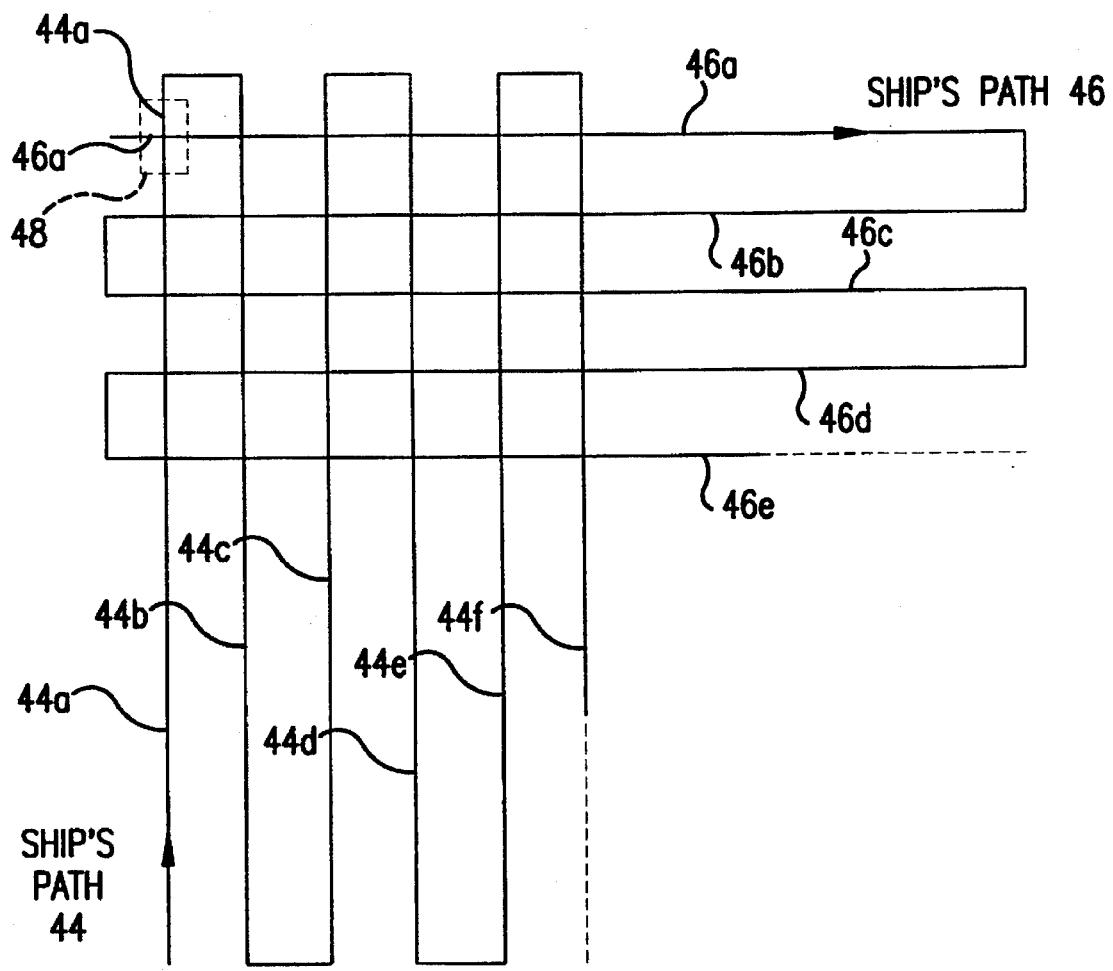
FIG. 6 is a plan view (not drawn to scale) of a typical manner of a ship's path in bottom topographic mapping which includes a plurality of orthogonal passes or sweeps of FIG. 4.

FIG. 6 illustrates a plan view (not drawn to scale) of a typical technique of bottom topographic mapping. Ship's first path 44 (the primary survey line) is comprised of parallel runs 44a–f which are orthogonal to parallel runs 46a–e of ship's second path 46 (the tie line). In mapping the sea bottom, for example, the ship may travel the "route" defined by ship's paths 44 and 46.

Figure 7:
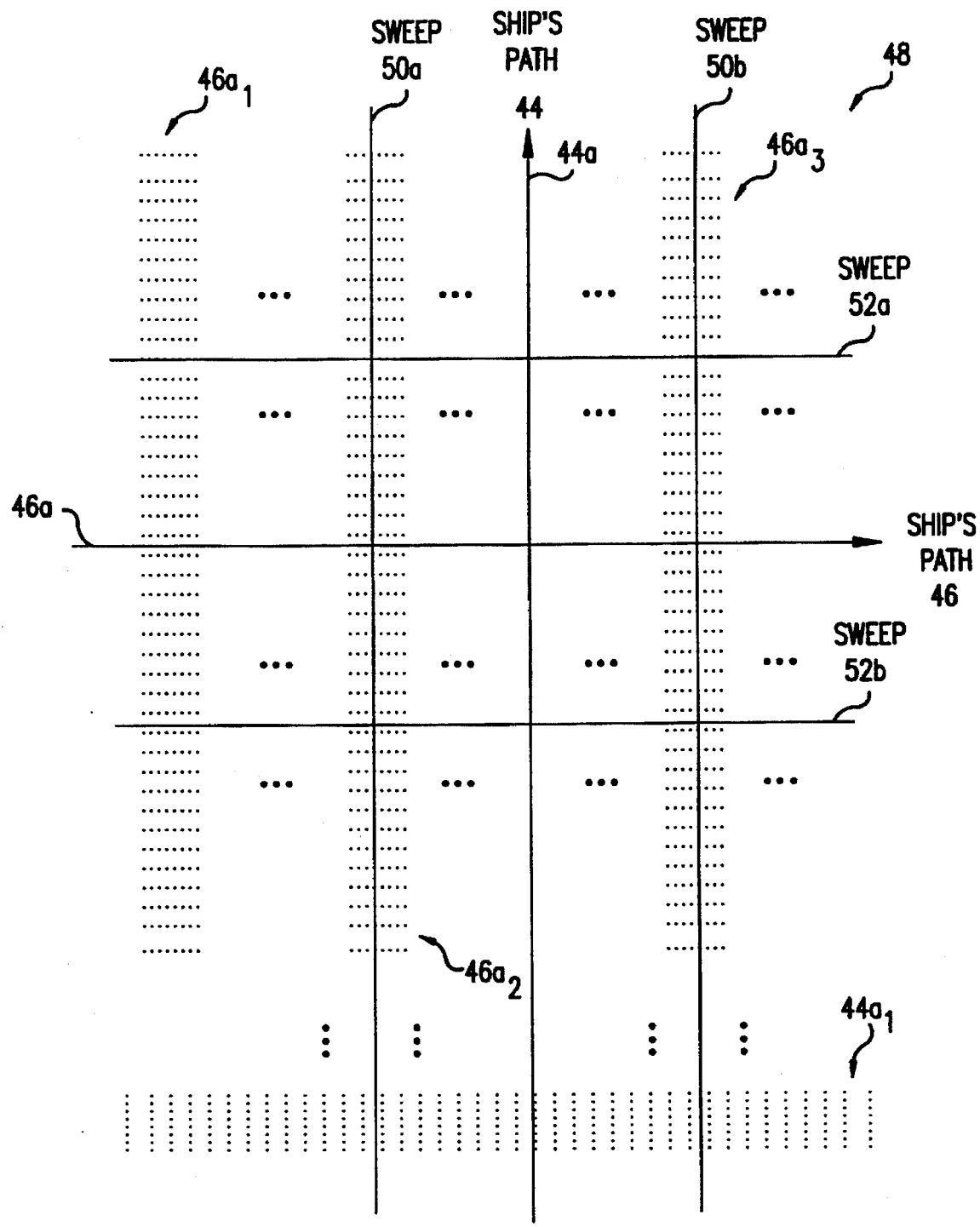
FIG. 7 is a plan view of a portion of FIG. 6 (area in the dotted box) illustrating in detail a pair of orthogonal sweeps and a plurality of sounding strips orthogonal to the direction of the ship's path.

FIG. 7 illustrates the intersection of ship's path 44a and ship's path 46a and the geographic area in the dotted box 48 of FIG. 6. With reference to FIG. 7, a plurality of sounding strips (generally designated $46a_1$, $46a_2$ and $46a_3$) are illustrated for the ship's path 46a. The sounding strips represent a plurality of geographic locales (individual receiving strips 34 of FIG. 4). Bathymetric information is obtained for these sounding strips and the composite "picture" is a map of the bottom 40 which is representative of information relating to the depth of the medium (e.g, an ocean).

With continued reference to FIG. 7, the ship's path 44a also includes a plurality of sounding strips generally represented as $44a_1$ which are orthogonal to the direction of travel of the ship 30. These sounding strips include reference beams which are beams projected at 45° angles relative to the vertical axis of the array. These reference beams provide bathymetric information representative of a plurality of locales on sweep 50a and sweep 50b (each is projected at a beam steering angle of 45°). The locales on sweep 50a and 50b are a combination of returns for beams projected at a beam steering angle of 45° for a plurality of sounding strips $44a_1$ on ship's path 44a.

The locales (geographic locations for which bathymetric data exists) on sweeps 50a and 50b "overlap" sounding strips in'sounding strip groups $46a_2$ and $46a_3$, respectively. In particular and with reference to FIG. 8, the sweep 50a includes a plurality of locales which are in common or coincide with at least one sounding strip in sounding strip group $46a_2$. Similarly, the sweep 50b includes a plurality of locales which have common geographic locales (locales which overlap) with at least one sounding strip in sounding strip group $46a_3$. Thus, the plurality of locales on the sweep 50a and the sweep 50b overlap a plurality of locales on a sounding strip in sounding strip group $46a_2$ and $46a_3$, respectively. Stated differently, each sweep (50a and 50b) includes a plurality of locales which geographically correlate to beam angles on a sound strip (sounding strip group $46a_2$ and $46a_3$).

Figure 8:
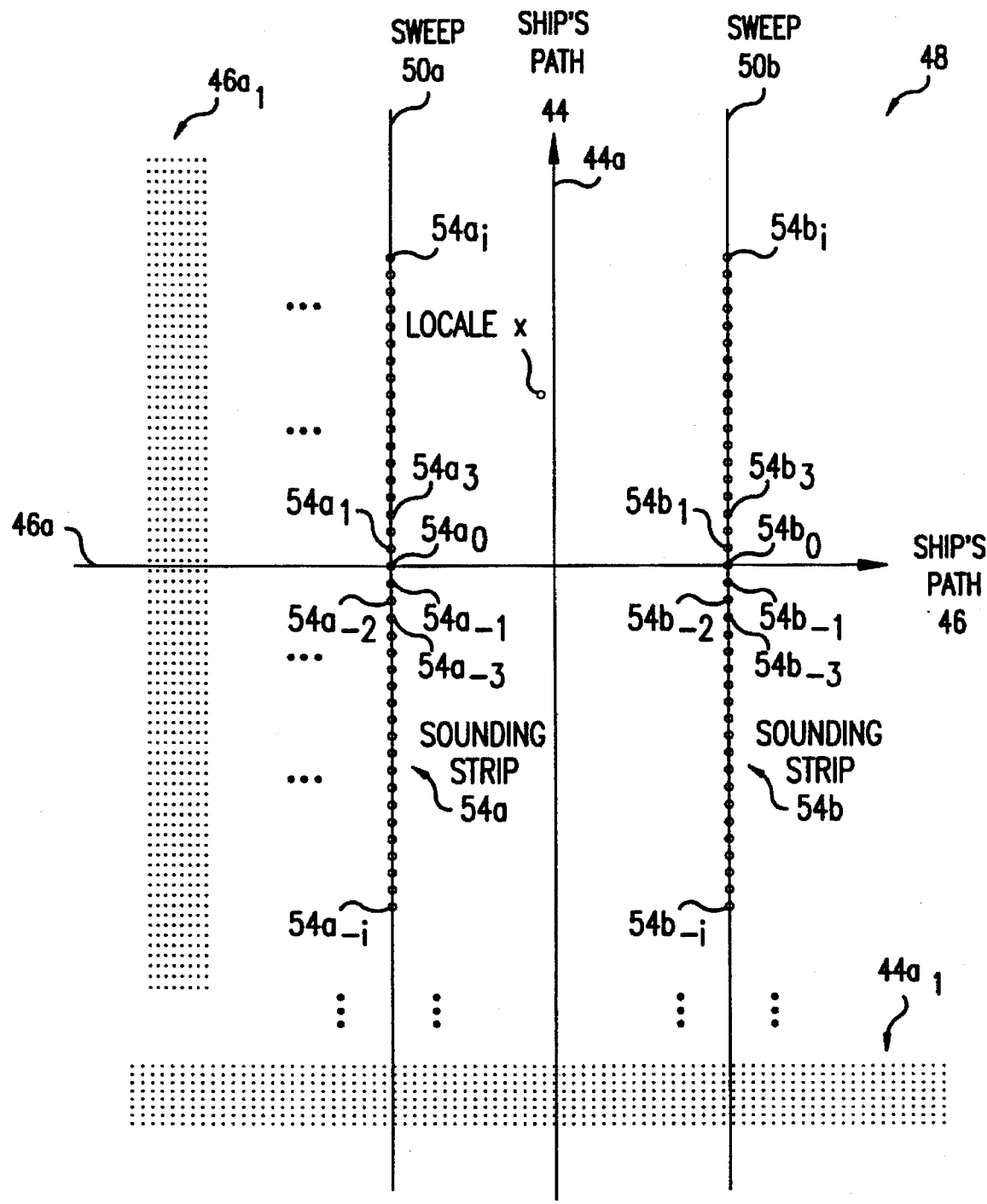
FIG. 8 is a functional plan view of a portion of FIG. 6 (area in dotted box) illustrating a plurality of locales for sounding strips geographically correlated to bathymetric data of reference beams.

As mentioned above, the reference beams provide bathymetric data of the locales along sweeps 50a and 50b. With reference to FIG. 8, sounding strip 54a (one ping along path 46) geographically correlates to sweep 50a. Similarly, sounding strip 54b (another ping along path 46) geographically correlates to sweep 50b. The signal processing unit 10 employs the bathymetric data corresponding to the locales on sweeps 50a and 50b (in conjunction with echo time data from a reference beam) to compute the sound velocity, sound velocity profile: sound velocity gradient (and/or sound velocity error, sound velocity error profile, sound velocity error gradient). The bathymetric data computed from the echo returns along sweeps 50a and 50b have negligible depth errors because of relatively small errors related to uncertainty in sound velocity.

In particular, the signal processing system 10 generates soundings along sounding strip 54a associated with path 46 (one ping on this path) projected at a plurality of angles relative to the vertical. In one preferred embodiment, the system 10 employs the echo return representative of a beam projected at locale $54a_o$ (i.e., 0° from the vertical axis) in order to calculate a sound velocity profile for the sounding strip 54a. The receiver array 26 senses the return and the signal processing unit 12 calculates the echo time for that beam. The signal processing unit 12, using the bathymetric data measured at locale $54a_o$ by sweep 50a and the echo time for the beam projected at locale $54a_o$ on sounding strip 54a, calculates the sound velocity through the medium at locale $54a_o$. The signal processing unit 12 may employ the following equation to calculate the sound velocity:

Sound Velocity = (2 × bathymetric data of beam 50a associated with path 44)/Echo Time of path 54

In another preferred embodiment, the sound velocity profile of the sounding strip 54a is calculated using the echo returns of a plurality of beams projected at locales along sounding strip 54a. The processing system 10 employs the echo return representative of these beams projected at the plurality of locales $54a_i$ to $54a_j$ to calculate a sound velocity profile for the sounding strip 54a. Each of these locales are measured using beams which are projected by the transmitter array at a beam steering angle that permits the echo time of the locale to be measured. The receiver array 26 senses the returns and the signal processing unit 12 calculates the echo times for each beam. The signal processing unit 12 correlates the bathymetric data for a given locale along sweep 50a to the echo time for that locale on sounding strip 54a. For example, the signal processing unit 12 correlates the bathymetric data representative of locale $50a_x$ (on sweep 50a) to the echo time measured or calculated for locale $54a_x$ on sounding strip 54a.

The signal processing unit 12 calculates the sound velocity through the medium at a given locale using bathymetric data measured by the reference beam (sweep 50a) at that locale and the echo time (sounding strip 54a) measured for that same locale. The signal processing unit 12 may employ the following relationship to calculate the sound velocity:

Sound Velocity$|_{local\ y}$=(2×Bathymetric Data$|_{locale\ y}$)/Echo Time$|_{locale\ y}$ where:

locale y is a position on the sounding strip/sweep.

In those instances where locale y is remote from the vertical, the data processing unit 12 may employ a relationship which incorporates the effects of ray bending and slant range travel time to calculate the bathymetric information. Under this circumstance, the sound velocity calculation may be compensated for ray bending and slant range for locales displaced from the vertical (greater than ±5°) which may provide more accurate measurements of the sound velocity.

The sound velocity profile may be "constructed" or "compiled" using the sound velocities calculated as described above. In this regard, the sound velocity profile for sounding strip 54a may be developed using one, several or all of the sound velocities calculated in the manner described above.

In one preferred embodiment, however, the sound velocity profile of the medium at sounding strip 54a is determined using data representative of a beam directed along or near the vertical (e.g., $54a_o$). The profile is then developed using the sound velocity through the medium at locale $54a_o$.

With continued reference to FIG. 8, a sound velocity gradient may be calculated using the bathymetric data from sweep 50b. The geographic locales on sounding strip 54b correlate to the locales on sweep 50b for which bathymetric data exists. In the same manner as described above for sounding strip 54a, the system 10 calculates the sound velocity through the medium at locale $54b_o$ using the echo return representative of a beam projected at locale $54b_o$ having a beam steering angle of 0° from the vertical axis of the receiver array 26. The receiver array 26 senses the return and the signal processing unit 12 calculates the echo time for that beam. In the same manner as described above for locale $54a_o$, the signal processing unit 12, using the bathymetric data measured at locale $54b_o$ on sweep 50b, calculates the sound velocity in the medium at locale $54b_o$. The signal processing unit 12 may employ the same equation to calculate the sound velocity at locale $54b_o$.

Similar to that for the sound velocity profile of sounding strip 54a, the sound velocity profile for sounding strip 54b may also be constructed using one, several or all of the sound velocities which are calculated. Thus, the signal processing unit 12 may employ the following relationship to calculate the sound velocity and later the sound velocity profile of sounding strip 54b:

Sound Velocity$|_{locale\ y}$=[2×Bathymetric Data$|_{locale\ y}$]/Echo Time$|_{locale\ y}$ where:

locale y is the geographic location on sounding strip 54b.

As mentioned above, the present invention may be implemented using a variety of relationships, including that stated immediately above as well as those incorporating ray bending effects and slant range travel time. Thus, the particular equation used to calculate the sound velocity and later the sound velocity profile of sounding strip 54b may vary according, for example, to the location of locale y in relation to the vertical. In this regard, where the locale y is located remote from the vertical (greater than ±5°), calculation of bathymetric data should employ relationships that account for ray bending effects and slant range.

In one preferred embodiment, the signal processing unit 12 may generate a sound velocity gradient using the sound velocity profiles of sounding strips 54a and 54b. In one embodiment, the gradient is calculated using a linear approach. In this regard, the sound velocity data on the same latitude is used to determine a linear "fit" between the two values on the sound velocity profile.

In another embodiment, a sound velocity gradient between sweeps 50a and sweeps 50b (which include a plurality of sounding strips disposed therebetween) may be calculated using a linear fit of the sound velocity calculated for locale $54a_o$ and locale $54b_o$. Under this circumstance, each of the sound velocity profiles for the plurality of sounding strips within the region between sweep 50a and sweep 50b may be calculated primarily from the gradient generated using sound velocity data calculated for locale $54a_o$ and locale $54b_o$.

Other techniques may be employed to calculate a suitable sound velocity gradient. For example, a weighted "fit" may be employed which depends upon depth, salinity and temperature of the medium at each sounding strip. Other gradient formulation techniques, known to those skilled in the art, may be employed.

The signal processing unit 12 employs the sound velocity gradient to correct bathymetric data for a plurality of locales within the gradient for errors in sound velocity. In this regard, the signal processing unit 12 calculates bathymetric data for a given locale using the sound velocity computed at the locale (determined from the sound velocity gradient) and the echo time measured for a sounding at that locale. For example, with reference to FIG. 8, bathymetric data for "locale x" may be determined using the sound velocity given by the sound velocity gradient at location x and the echo time of a sound at locale x (during data collection during ship's path 46a). This technique of bathymetric measuring provides highly accurate depth information which is relatively free of errors in the sound velocity.

The signal processing unit 12 according to the present invention may calculate sound velocity error which may be employed to correct, reduce or minimize depth related errors which are caused by inaccurate sound velocity information. With reference to FIG. 8, sound velocity error for locale $54a_o$ is calculated in a manner similar to that for calculating the sound velocity at locale $54a_o$. The signal processing unit 12 employs the echo return representative of a beam projected at locale $54a_o$ (i.e., 0° from the vertical axis of the array) in order to calculate a sound velocity error at locale $54a_o$ on the sounding strip 54a. The receiver array 26 senses the return and the signal processing unit 12 calculates the echo time for that sounding. The signal processing unit 12, using the bathymetric data measured at locale $54a_o$ by sweep 50a (locale $50a_o$), calculates the sound velocity error through the medium at locale $54a_o$ using the following relationship (or a derivative thereof):

$$\frac{dZ}{Z} = (1 - \tan^2(\theta_\alpha)) * \frac{dC_\alpha}{C_\alpha}$$

It should be noted that in those instances where the surface sound velocity is known, the relationship stated above may be employed for any mounting angle of receiver array 26. That relationship is also applicable for a horizontally mounted receiver array 26.

Figure 9C:
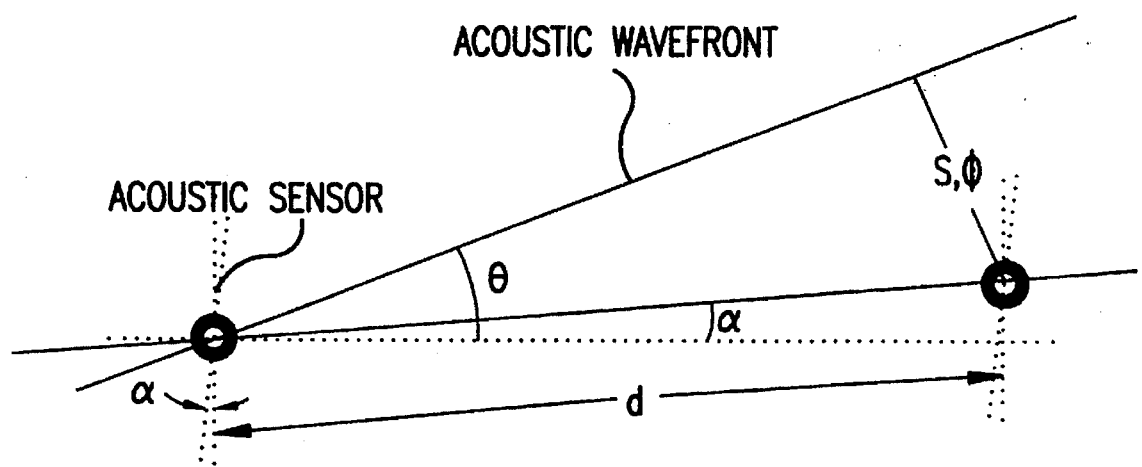
FIG. 9C is an illustration of the relationship between the phase delay and steering angle for an acoustic wavefront.
Figure 9A:
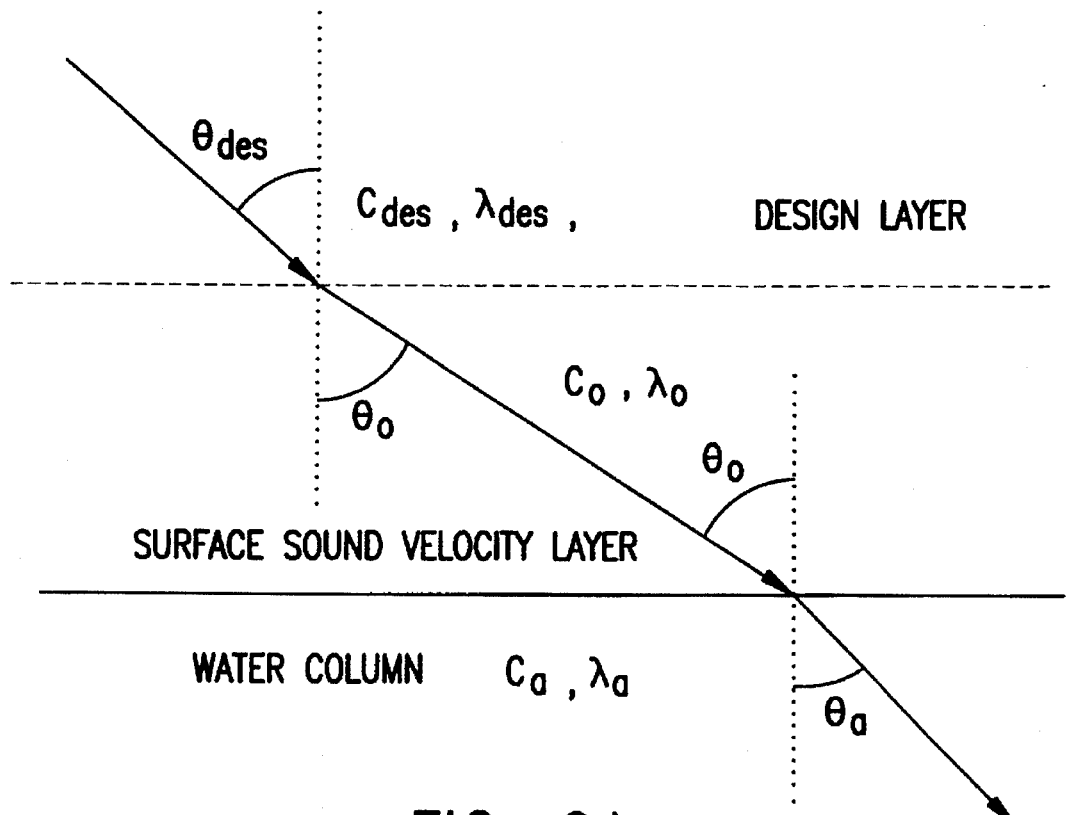
FIG. 9A is a general illustration of Snell's Law for a steered beam from a line array.
Figure 9B:
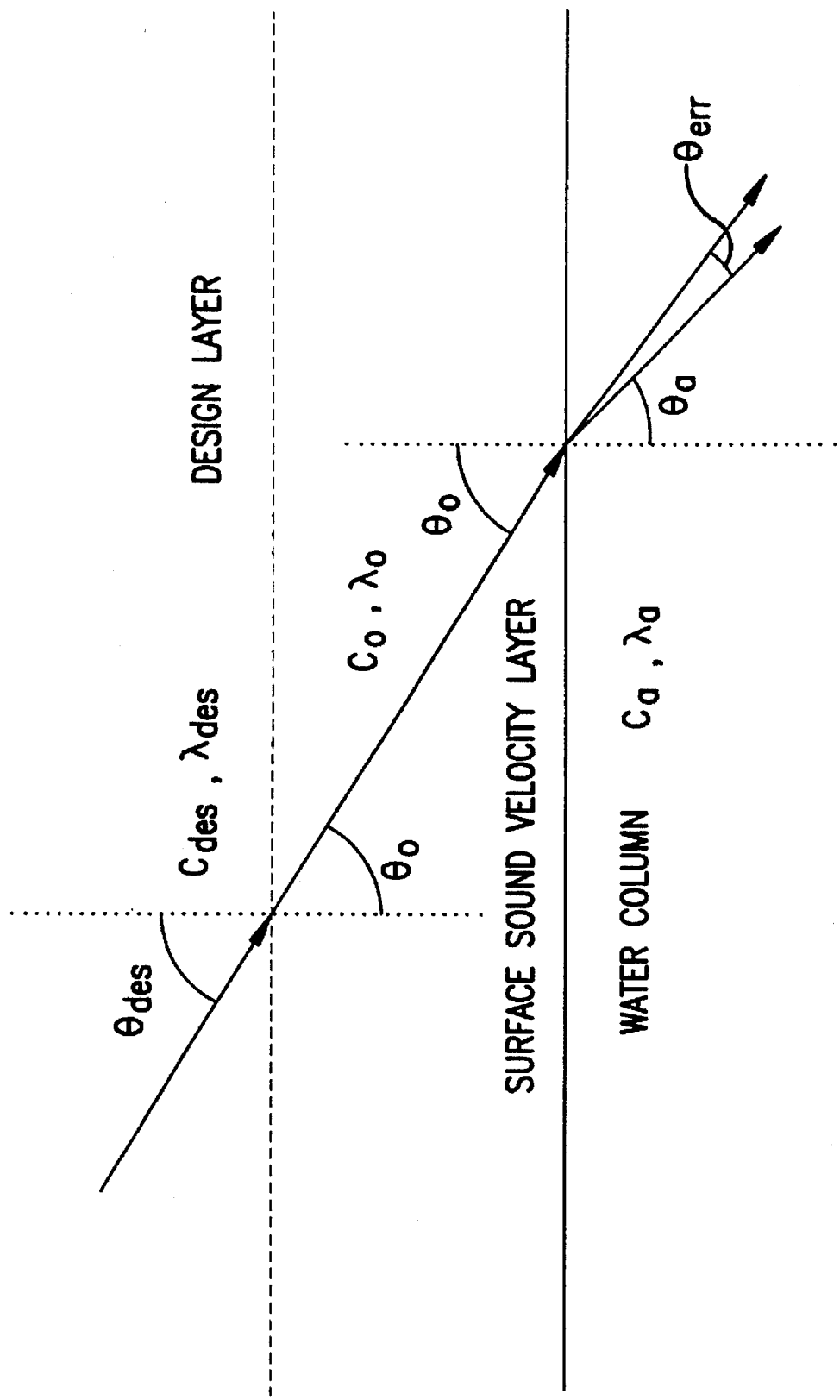
FIG. 9B is a general illustration Snell's Law for a broadside beam of a tilted line array, respectively.

With reference to FIGS. 9A and 9B, the extent of the depth errors caused by sound velocity error may be approximated as a sensitivity to a surface sound velocity error and a sensitivity to an error in the average sound velocity within the water column, $C_{avg}$. Under this circumstance and for a sonar system 10 having a receiver array 26 which is mounted on the hull 28 of the ship 30 in a horizontal manner (FIGS. 3B), the proportional depth error, as indicated above, may be represented by:

$$\frac{dZ}{Z} = (1-\tan^2(\theta_\alpha)) * \frac{dC_\alpha}{C_\alpha}$$

In a preferred embodiment, a sound velocity error profile may be calculated for sounding strip 54a using the sound velocity error computed for locale $54a_o$ (i.e., 0° from the vertical axis of the array). The depth error profile, in a preferred embodiment, is constructed using curve fit to a $\tan^2$ function having a magnitude at 0° substantially equal to the sound velocity error computed for locale $54a_o$. FIG. 10 illustrates such a depth error profile. The signal processing unit 12 may then "correct" the bathymetric data measured for the locales on sounding strip 54a using the sound velocity error profile.

In another embodiment, the sound velocity error profile for sounding trip 54a may be calculated using the sound velocity error computed for each of the locales on sounding strip 54a (locales $54a_i$ to locale $54a_j$). The sound velocity error for each locale on sounding strip 54a is computed in a similar manner, accounting for ray bending and slant range, as described above for locale $54_o$. The sound velocity error profile is then "constructed" using the values of the sound velocity error for the sounding strip 54a.

Further, it should be noted that the sound velocity error profile for sounding strip 54a may be computed or derived using one, some or all of the sound velocity errors calculated for each of the locales on sounding strip 54a.

The signal processing unit 12 may also generate a sound velocity error gradient using the sound velocity profiles for a plurality of sounding strips (e.g., sounding strips 54a and 54b). In one preferred embodiment, a sound velocity error gradient between sounding strips 54a and 54b (which include a plurality of sounding strips disposed therebetween) may be calculated using a linear fit of the sound velocity error calculated for locale $54a_o$ and locale $54b_o$. Under this circumstance, each of the sound velocity error profiles for the plurality of sounding strips within the region between sounding strips 54a and 54b may be calculated primarily from the gradient generated using sound velocity data calculated for locale $54a_o$ and locale $54b_o$. These sound velocity error profiles may be "constructed" from the gradient data being a curve fit to a $\tan^2$ function.

Other techniques may be employed to calculate a suitable sound velocity gradient. For example, a weighted "fit" may be employed which depends upon depth, salinity and temperature. Further, similar to the sound velocity gradient, the signal processing unit 12 employs the sound velocity error gradient to correct bathymetric data for a plurality of locales within the gradient. In this regard, the signal processing unit 12 corrects bathymetric data for a given locale using the sound velocity error determined from the sound velocity gradient and the echo time or uncorrected bathymetric data measured for the sounding at that locale. For example, with reference to FIG. 8, "corrected" bathymetric data for locale x may be determined using the sound velocity error given by the sound velocity error gradient at location x and the echo time of a sound at locale x (whether during data collection during ship's path 46a). Further, the corrected bathymetric data for locale x may be determined using the sound velocity error and the uncorrected bathymetric data measured at locale x. These techniques of bathymetric measuring provides for highly accurate depth information which is relatively free of errors due to the sound velocity (surface and cavity sound velocity errors).

In those instances where the array is not horizontally mounted, surface sound velocity errors may impact upon depth errors (FIGS. 3A and 9C). Under this circumstance, the proportional depth error may be represented by:

$$\frac{dZ}{Z} = \tan(\theta_\alpha)^2 * \frac{dC_\alpha}{C_\alpha} - \left(1 - \frac{\tan(\theta_0 - \alpha)}{\tan(\theta_0)}\right) * \tan(\theta_\alpha)^2 \cdot \frac{dC_0}{C_0}$$

The sound velocity error profile using a receiver array 26 which are not horizontally mounted may be calculated in a manner similar to that described above for horizontally mounted arrays. However, under this circumstance, the sound velocity error consists of two components, an water column sound velocity error component and a surface sound velocity error component. The surface sound velocity may be determined using a surface sound velocimeter; as a result, the surface sound velocity error component is known, or has been "corrected" to zero, and the relationship above reduces to the same relationship which describes a horizontally mounted array with the addition of a known term.

The sound velocity error profile developed by a sonar system having a receiver array which is not horizontally mounted may be calculated in the following manner.

With reference to FIG. 8, sound velocity error for locale $54a_o$ is calculated in a manner similar to that for calculating the sound velocity at locale $54a_o$. The signal processing unit 12 employs the echo return representative of a beam projected at locale $54a_o$ (i.e., 0° from the vertical axis of the array). The receiver array 26 senses the return and the signal processing unit 12 calculates the echo time (at locale $54a_o$) for that beam. The signal processing unit 12, using the bathymetric data measured at locale $54a_o$ by sweep 50a (locale $50a_o$), calculates the sound velocity error through the medium at locale $54a_o$.

The signal processing unit 12 may then generate a sound velocity error profile for sounding strip 54a using the sound velocity error computed for locale $54a_o$ (i.e., 0° from the vertical axis of the array). The sound velocity error profile, in a preferred embodiment, is curve fit to a $\tan^2$ function having a magnitude at 0° substantially equal to the sound velocity error computed for locale $54a_o$ and the surface sound velocity error. It should be noted that the surface sound velocity is known using a velocimeter.

FIG. 10 illustrates the construct of the sound velocity error profile. The signal processing unit 12 may then "correct" the bathymetric data measured for the locales on sounding strip 54a using the sound velocity error profile.

Further, in another embodiment, the sound velocity error profile for sounding strip 54a may be calculated using the sound velocity error computed for each of the locales on sounding strip 54a (locales $54a_i$ to locale $54a_o$ to locale $54a_j$). The sound velocity error profile is then "constructed" using the values of the sound velocity error for the sounding strip 54. It should be noted that the sound velocity error profile for sounding strip 54a may be constructed using one, some or all of the sound velocity errors calculated for each of the locales on sounding strip 54a.

In a preferred embodiment, the signal processing unit 12 may employ the sound velocity error gradient to determine bathymetric data for a plurality of locales within the gradient in a manner similar to that described above for sonar systems employing a horizontal array. For the sake of brevity, the discussion is not repeated below.

Finally, it is noted that for broadside beams ($\alpha=\theta$ in FIG. 9C), the depth error relationship may be simplified to:

$$\frac{dZ}{Z} = (1 - \tan(\theta_\alpha)^2) * \frac{dC_\alpha}{C_\alpha} - \tan(\theta_\alpha)^2 * \frac{dC_0}{C_0}$$

Thus, to briefly summarize, in those instances where the sonar system 10 does not employ a receiver array 26 which is horizontally coupled or mounted to the hull 28 of ship 30, the surface sound velocity may impact the sound velocity calculations for a given locale as well as the sound velocity profile of a sounding strip. Accordingly, in a preferred embodiment, the sound velocity for a locale is calculated in a manner similar to that for the horizontally mounted array with the addition of a surface sound velocity component which is measured at the surface of the receiver array 26.

In another embodiment, the signal processing technique and system compensate or reduce errors in an estimated velocity of sound in an ocean, gulf, sea, bay, littoral region, lake, river, or the like at a specific locale using: (1) the bathymetric data and echo time data for the first sounding projected at a first locale and (2) the bathymetric data and echo time data for a second sounding projected at that same locale. In this embodiment, the angle of projection relative to the vertical need not be at 45°; instead, any angle of projection may be employed (with the constraint being that the projection angle should be selected such that a return echo is measured by the receiver array 26). For example, the sound velocity at a given locale may be calculated using a first sounding projected at an angle of 20° from the vertical and a second sounding projected at an angle of 40° from the vertical.

In operation, the sonar system 10 projects a first sounding in the direction of a given locale and measures a return signal. The data processing unit 12 calculates an echo time and bathymetric data for that sounding using an "estimated" sound velocity (for a particular time and date) through the medium at that locale. Similarly, the sonar system 10 projects a second sounding in the direction of the same locale and a response is measured. The data processing unit 12 calculates an echo time and bathymetric data for the second sounding using an "estimated" sound velocity (for a particular time and date) through the medium at that locale. The data processing unit 12 calculates the sound velocity error or the sound velocity at the given locale, for a particular time and date, using the bathymetric data and the echo time data from the first and second soundings. In this reward, the error in the sound velocity may be calculated using the following equation:

$$\Delta Ca = \frac{2 * (Z_2 - Z_1)}{[t_2 * \cos(\theta_{2w}) * (1 - \tan(\theta_{2w}))] - [t_1 * \cos(\theta_{1w}) * (1 - \tan(\theta_{2w}))]}$$

where (x represents 1st/2nd sounding):
$Z_x$=depth calculation based on estimated sound velocity [Note: $Z_x=\frac{1}{2}*t_x*C*\cos(\theta_{xw})$];
$t_x$=echo time data for the second sounding;
$\theta_{xw}$=angle of projection in the water column relative to the vertical of the transmitter array [Note: $\theta_{xw}$=as in $((C_{actual}/C_{estimated})*\sin(\theta_{xd}))$];
$C_{actual}$=actual velocity of sound through the fluid for that given time and date; and
$\theta_{xd}$=angle of projection in the surface layer (design angle).

The signal processing unit 12 may employ the sound velocity error to calculate the sound velocity at the given locale. In this regard, the sound velocity is "corrected" to reflect the sound velocity error determined in the manner described above. The signal processing unit 12 may then "recalculate" the bathymetric data for that locale using the corrected sound velocity.

In this preferred embodiment, a surface sound velocity which is unknown or non-zero may contribute to an error in the calculated sound velocity. However, as mentioned above, where the array is a horizontal array, the surface sound velocity related depth errors are insensitive to sound velocity errors in surface layer (surface sound velocity errors); and, as a result, there are essentially no errors in the sound velocity attributable to the surface layer.

Finally, the signal processing unit 12 may calculate a sound velocity profile, sound velocity error profile, sound velocity gradient, and sound velocity error gradient using the sound velocity error and/or sound velocity determined according to this preferred embodiment. The techniques of developing the sound velocity profile, sound velocity error profile, sound velocity gradient, and sound velocity error gradient using the sound velocity error and/or sound velocity are discussed above.

It should be noted that the sound velocity and/or sound velocity error may be calculated using any of the techniques described above. That sound velocity and/or sound velocity error data may then be employed to calculate a sound velocity profile, sound velocity error profile, sound velocity gradient, and sound velocity error gradient.

In another embodiment, the signal processing system and technique compensates, reduces or eliminates errors in the measured sonar data attributable to roll bias error. Roll bias error is generally defined as a deviation or variation between the attitude of the sonar array and the attitude sensing system (vertical reference unit) of the ship 30.

Briefly, by way of overview, the signal processing system and technique of this embodiment, use tie-lines in surveys to provide the data necessary to correct for residual roll bias. When a starboard beam of the tie-line (measuring the bathymetry of a locale) crosses the same starboard beam of the primary survey line (measuring the bathymetry of that same locale), the depths should be in error by the tidal and draft differences, only (assuming that any errors in the bathymetric data caused by inaccurate sound velocity data have been rendered negligible). Similarly, when a port beam of the tie-line measuring the depth at a locale) crosses that same port beam of the primary survey line (measuring the depth of that same locale) the depths should also be in error by the tidal and draft differences, only.

In contrast, when a starboard beam of the tie-line for a locale crosses the port beam of the primary survey line at that locale, the depths should be in error by the tidal and draft differences and by roll bias error. Further, when a port beam of the tie-line projected at a locale crosses the starboard beam of the primary survey line for that locale, the depths should also be in error by the tidal, draft, and roll bias.

With that framework, the technique of compensating, reducing or eliminating errors in the measured sonar data attributable to roll bias error is described in detail below for beams which are projected at 45° angles from the vertical of the array. As mentioned above, beams projected at such angles experience negligible depth errors due to sound velocity. The technique, however, is not limited to using tie-line crossings in surveys at 45° angles from the vertical of the array. Rather, the invention may be implemented using bathymetric data measured at a specific locale projected at a specific angle for a first survey line and a second survey line. The "type" of errors in such bathymetric data depend on whether the beams for the survey lines are projected from the starboard or port sides of the ship 30.

With reference to FIG. 2, the signal processing system and technique of the present invention employs beams which are projected at substantially 45° angles from the vertical as reference beams. Briefly, in this embodiment, when the starboard 45° beam of the tie-line crosses the starboard 45° beam of the primary survey line or when the port 45° beam of the tie-line crosses the port 45° beam of the primary survey line, the depths are in error by the tidal and draft differences, only. In contrast, when the starboard 45° beam of the tie-line crosses the port 45° beam of the primary survey line or when the port 45° beam of the tie-line crosses the starboard 45° beam of the primary survey line, the depths are in error by the tidal, draft, and roll bias. Thus, utilizing multiple crossing points in areas of low relief, the roll bias can be reliably determined. The bathymetry can then be corrected by adding a "counter-slope" to the (bathymetric) data.

Figure 11:
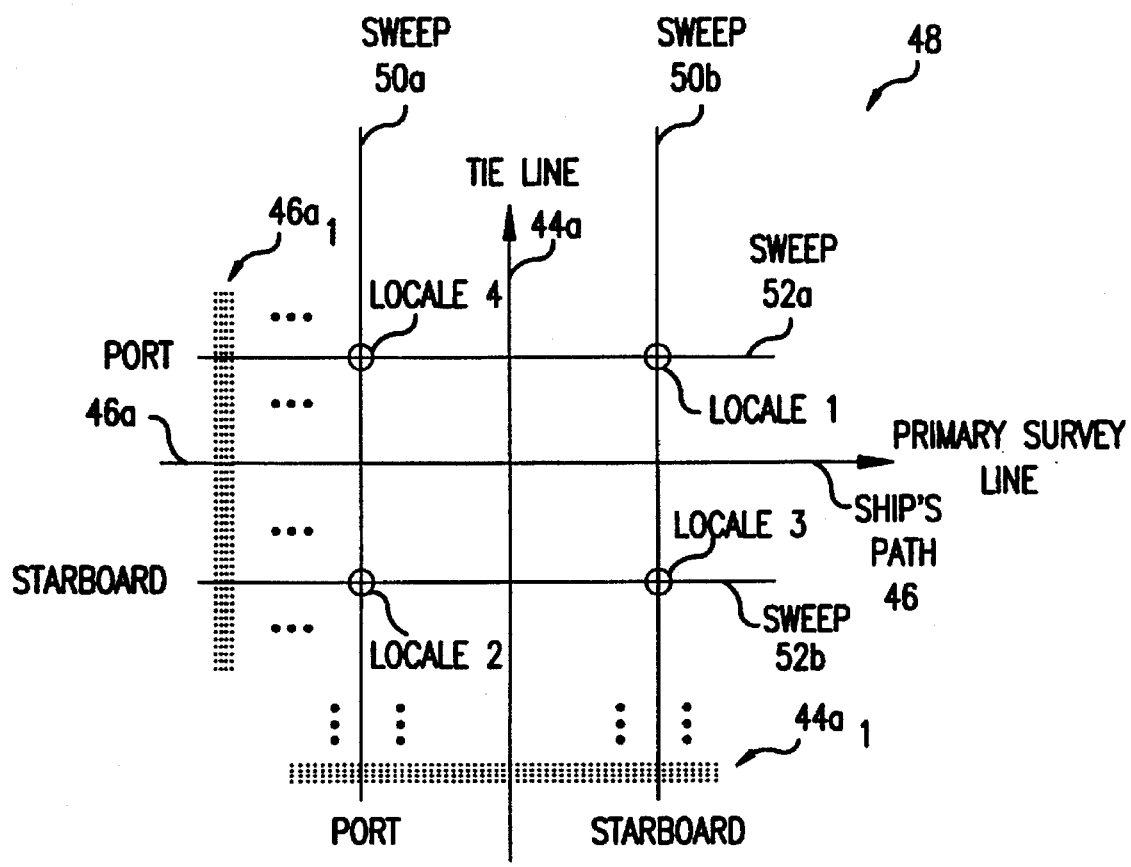
FIG. 11 is a plan view of a portion of FIG. 6 (area in the dotted box) illustrating in detail orthogonal sweeps and reference beams for those sweeps.

In particular, the signal processing unit 12, in a preferred embodiment, calculates roll bias errors using bathymetric data for a plurality of beams projected at substantially 45° degrees from the vertical of the array. With reference to FIG. 11, the signal processing unit calculates the bathymetric data for locale 1 (on sweep 50b) during the primary survey line (ship's path 46) and bathymetric data for locale 1 (on sweep 52a) during the tie line (ship's path 44). The signal processing unit 12 compares the bathymetric data of locale 1 and computes a roll bias error. As mentioned above, the depth measurements are in error by tidal, draft and roll bias. Thus, the signal processing unit 12 calculates the roll bias error by subtracting tidal and draft components from the bathymetric data of locale 1. The signal processing unit 12 generates a "counter-slope" to use as a correction factor for all of the bathymetric data measured. The signal processing unit 12 may construct or derive a "counter-slope" using several different techniques including those for real time systems (after determining the correct value of roll bias) and in post-processing systems (correcting for roll-bias after collection of sonar data).

Three techniques for correction of roll bias are described in detail below. The first embodiment may be implemented in either a real-time system or a post-processing system. The second and third techniques may be employed in post-processing systems. It is noted that the third embodiment may be a less exact method of roll bias error correction in that it assumes that a small variation (bias) in the direction of a beam influences the offsets induced by ray-tracing through the sound velocity profile minimally.

For example, compute depth and crosstrack with the actual sound velocity profile and get the values $Z_{actual}(i)$ and $X_{actual}(i)$. Next compute depth and crosstrack with the actual sound velocity profile, but with the beam angles increased by the amount $\theta_{bias}$. The resulting values will be $Z_{bias}(i)$ and $X_{bias}(i)$. For most cases, the values of arctan $[X_{actual}(i)/Z_{actual}(i)]$ and the values of arctan $[X_{bias}(i)/Z_{bias}(i)]$ will differ by the amount $\theta_{bias}$ with a residual error which is much smaller than $\theta_{bias}$. In short, rotating the profile computed with a roll bias error, by an amount equal to the roll bias, will remove most of the error caused by the roll bias.

Three techniques for correcting roll bias induced errors are discussed below. These methods differ in technique due to the type of data which is available about each sounding point while the data processing unit 12 performs roll bias correction or compensation.

The original measurements recorded for each sounding point include a time-of-arrival, $t_{arr}(i)$, and an expected direction to target, $\theta_{meas}(i)$. For the purpose of applying roll bias correctors, it is assumed that only the expected direction to the target is correctable in accordance with EQUATION A below.

Further, a presumption is that a roll bias exists of $\theta_{bias}$. The polarity of this bias is defined such that the $i_{th}$ beam with an expected angle of $\theta_{meas}(i)$ from the vertical has an error of $\theta_{bias}$ relative to the vertical such that $$\theta_{actual}(i) = \theta_{meas}(i) - \theta_{bias} \qquad (A)$$

where $\theta_{actual}(i)$ is the actual angle of the $i_{th}$ beam.

It should be noted that the techniques described herein generally refer to "beams" as having correctable angles. Direct measurement of the target directions through interferometric and other processes is also included as correctable by these same techniques.

In a first embodiment, the original $t_{arr}$ and $\theta_{meas}$ are employed in the roll bias correction process because the original $t_{arr}$ and $\theta_{meas}$ for each sounding point are available for use in the roll bias correction process. The first embodiment may be implemented in either a real-time system or a system that corrects for roll bias post-processing. The corrected direction to the ith before the $i_{th}$ beam is made by subtracting the value of the roll bias from the expected target angle. The corrected beam angles are then used to compute depth and position for each sounding point. Specifically, EQUATION A is applied such that:

$$\theta_{actual}(i) = \theta_{meas}(i) - \theta_{bias} \qquad (B)$$

In a second embodiment, the original $t_{arr}$ and $\theta_{meas}$ are not employed in the roll bias correction process because the original $t_{arr}$ and $\theta_{meas}$ for each sounding point may not have been recorded or are simply not available for use in the roll bias correction process. This embodiment may be implemented in a system which corrects for roll bias errors by way of post-processing. Although the original $t_{arr}$ and $\theta_{meas}$ for each sounding point are not available, the original sound velocity profile is known and the ship's attitude at reception of each sounding point is known with sufficient accuracy to reconstruct the original $t_{arr}$ and $\theta_{meas}$ for each sounding point.

In this embodiment, the original values for $t_{arr}(i)$ and $\theta_{meas}(i)$ are recovered. The corrected values for $\theta_{actual}(i)$ may then be determined using EQUATION B in the same manner as described above. Using the new values $t_{arr}(i)$ and $\theta_{actual}(i)$ and the known sound velocity profile, the data processing unit may recompute the appropriate sounding point depths and positions.

A third technique for compensating for roll bias error is described below. Although this method is less "exact" than those described above, this technique, as mentioned above, assumes that a small variation (bias) in the direction of a beam minimally influences the offsets induced by ray-tracing through the sound velocity profile.

In this technique, the original $t_{arr}$ and $\theta_{meas}$ are not employed in the roll bias correction process because the original $t_{arr}$ and $\theta_{meas}$ for each sounding point may not have been recorded or are simply not available for use in the roll bias correction process. The data available for sounding point positions relative to the sensor arrays, after applying the ship's attitude correctors and the known sound velocity profile, is depth, "Z", alongtrack, "Y", and acrosstrack, "X".

In contrast to the second technique, it may not be possible to recover the original values for $t_{arr}$ and $\theta_{meas}$. Under this circumstance, assume: (1) that the alongtrack offset remains unchanged; (2) a nominal sound velocity value with an iso-velocity profile and compute range values and target directions to the points defined by $Z_i$ and $X_i$ (use only the depth and cross track position); and (3) sounding point data for the ith point is:

| Depth | Z(i) |
|---|---|
| Acrosstrack distance | X(i); and |
| Alongtrack distance | Y(i). |

The data processing unit may employ the roll bias corrector of EQUATION B. The data processing unit may recompute the depth and location for each sounding point using the corrected value for direction to target. Specifically, the correction is applied such that:

Range (i)=$X(i)^2+Z(i)^2$;

$\theta_{meas}(i)$=atan(X(i)/Z(i));

$\theta_{est}(i)=\theta_{meas(i)-\theta bias}$;

Z(i)=Range(i)*cos($\theta_{est}(i)$);

X(i)=Range(i)*sin($\theta_{est}(i)$); and

Y(i)=Y(i).

It is noted that the bias error may also be calculated using bathymetric data for locale 2 (on sweep 50a) during the primary survey line (ship's path 46) and bathymetric data for locale 2 (on sweep 52b) during the tie line (ship's path 44). Upon calculating the roll bias error, the signal processing unit 12 may then calculate a "counter-slope", in a manner as described above, which negates the errors due to differences in the attitude between the array 26 of a sensing system on the ship 30 and the attitude sensing system of the ship 30, wherein the attitude sensing system (e.g., a vertical reference unit) measures the attitude of the vessel in the roll axis.

It is noted that in shallow waters, tide may be the greatest and most important variable which impacts on a correct measurement of the bathymetric data. Tidal effects in the deep ocean are less important because the tide is often small and constitutes a much smaller percentage of the total depth yielding a relatively insignificant effect on depth and roll bias measurements.

With continued reference to FIG. 11, the tidal differences may be calculated using the starboard and port 45° beam of th tie-line crosses the starboard and port 45° beam of the primary survey line, respectively. Here, the errors in depths should be due to the tidal and draft differences, only. Since the draft of the ship may be calculated rather accurately, the errors in depth may be reduced to those attributable to tidal differences.

In one embodiment, the tidal differences may be calculated for sweeps 50b/52b using a beam projected at a locale (e.g., locale 3) during the primary survey line and the tie line. The bathymetric data measured for the sweeps 50b/52b may be corrected to compensate for errors due to the tidal difference. Similarly, the tidal differences may be calculated for sweeps 50a/52a using a beam projected at a locale (e,g., locale 4) during the primary survey line and the tie line. Further, the bathymetric data measured for the sweeps 50a/52a may be corrected to compensate for errors due to the tidal difference.

In another embodiment, the differences in depth measurements at locale 3 (measured by comparing sweeps 50b/52b) may be averaged with the differences in depth measurements at locale 4 (measured by comparing sweeps 50a/52a). The average of these two values may provide a tidal difference which may be employed to compensate the bathymetric data for any errors due to tidal differences.

It is noted that it may be assumed that the sensing system acquires information of all four locales (locales 1–4) along ship's path 44 within an insignificant time difference relative to the tidal periods. Similarly, the sensing system acquires information of all four locales (locales 1–4) along ship's path 46 within an insignificant time difference relative to the tidal periods. However, the time difference between surveying these locales with ship's path 44 and surveying them with ship's path 46 may not be insignificant with respect to the tidal periods. As a result, it may be important to ensure that the tidal difference errors do not "corrupt" the roll bias measurements.

Theoretical Background:

As mentioned above, the extent of the depth errors caused by sound velocity errors may be approximated as a sensitivity to a surface sound velocity error and a sensitivity to an error in the average sound velocity within the water column, $C_a$. Whatever values these sensitivities assume, errors due to the surface sound velocity may reduced by the use of a sound velocimeter mounted near the hydrophone array so that it samples the same water that passes over the hydrophone array. Compensating for errors in surface sound velocity does not impact on the need to compensate or minimize for the effects of errors of the water column sound velocity. Thus, the problem still remains to minimize the effects of errors of the water column sound velocity profile.

While the process of depth calculation for slanted beams is well behaved mathematically, it depends upon high precision from other processes and data sources for success. These conditions can generally be met by considering a sufficiently large number of data points (specific soundings at tie-line crossing points within a survey area).

In one preferred embodiment, the present invention employs a "side-looking" beam which is essentially insensitive to sound velocity errors in the water column to generate a correction for bathymetry errors caused by the sound velocity profile. These velocity profile correctors are used to correct sound velocity errors in the data collected for the beams of the sonar system.

It should be noted that under the circumstances of a horizontally mounted hydrophone array, the solution is insensitive to errors in the surface layer (surface sound velocity errors). As a result, in sonar systems having a hydrophone array 26 which is mounted in horizontal configuration relative to the earth (FIG. 3B), there are essentially no depth errors related to the sound velocity in the surface layer.

The correction, reduction or minimization of the bathymetry data for errors in the sound velocity profile is discussed below under the assumption that any residual errors due to roll bias have been eliminated or minimized. Without roll bias, the only differences which impact upon the bathymetric data at the crossings of the 45° beam are vessel heave, tide and draft differences.

In a preferred embodiment, the roll bias error correction, reduction or minimization is performed before correction of the errors in the sound velocity profile is made. This modified data is then employed to correct or reduce errors in the bathymetric data caused by sound velocity profile errors.

Briefly, by way of background, it is difficult to define the magnitude of depth or positioning error that may result from all potential error combinations in defining the sound velocity profile. There may be a variety of depth/velocity combinations used to define any given profile and errors of various magnitudes and signs may exist in specifying these velocities. Therefore, it is necessary to constrain the problem to a manageable level.

The following analysis constrains the calculations to a sound velocity profile with only two layers (FIGS. 9A and 9B). The first layer begins at the array face (surface layer) and is so thin that only inconsequential depth or positioning errors can occur within this layer. It serves only for application of Snell's Law to the ray bending problem. The second layer (water column layer) has uniform velocity throughout. While this assumption may not provide precise ray bending corrections, it provides a proper measure of sensitivity to errors in the mean sound velocity profile.

An assumption in the derivation is that the average sound velocity, $C_a$, is sufficiently close to the harmonic mean velocity, $C_{harm}$, to determine the sensitivities. In short, it is assumed that:

$$\frac{C_{harm}}{C_a} \approx 1.0, \text{ and } \frac{\partial C_{harm}}{\partial C_d} \approx 1.0.$$

It may be shown that for a profile with a sound velocity of $C_1^*(1-\delta/2)$ for one half of the depth and a velocity of $C_1^*(1+\delta/2)$ for the other half of the depth, then $C_a = C_1$ and $$C_{harm} = C_a^*[1-(\delta/2)^2]$$

Further, if $\delta=0.04$ (i.e., 4%), then $C_{harm} = C_a^* \, 0.9996$. This is sufficiently close to satisfy the above conditions.

It is further assumed that the array is a straight line array tilted at angle $\alpha$ (tilt angle, $\alpha$, includes both vessel roll and installation choices). Under these conditions, the relationship of the Design Angle, $\theta_d$ and the Launch Angle, $\theta_0$, may be expressed as:

$$\frac{\sin(\theta_d - \alpha)}{C_d} = \frac{\sin(\theta_0 - \alpha)}{C_0} = B \quad \text{Eq. 1}$$

angular error, $d\theta_0$, of the beam within the surface layer may be represented by:

$$d\theta_0 = \frac{\partial \theta_0}{\partial \theta_d} * d\theta_d + \frac{\partial \theta_0}{\partial \alpha} * d\alpha + \frac{\partial \theta_0}{\partial C_d} * dC_d + \frac{\partial \theta_0}{\partial C_0} * dC_0 \quad \text{Eq. 2}$$

Where $\theta_d$, $\alpha$ and $C_d$ are precisely known, then $d\theta_d$, $d\alpha$ and $dC_d$ are all equal to zero and EQUATION 2 reduces to $$d\theta_0 = \frac{\partial \theta_0}{\partial C_0} \, dC_0 \quad \text{Eq. 3}$$

Partial differentiation of EQUATION 1 gives the sensitivity, $\partial \theta_0 / \partial C_0$, as $$\frac{\partial \theta_0}{\partial C_d} = \frac{\tan(\theta_0 - \alpha)}{C_0} \quad \text{Eq. 4}$$

Substitution of the sensitivity define by EQUATION 4 into EQUATION 3 yields:

$$d\theta_0 = \tan(\theta_0 - \alpha) * \frac{dC_0}{C_0}. \quad \text{Eq. 5}$$

For the interface between the surface layer and the remainder of the water column, Snell's Law provides the relationship:

$$\frac{\sin(\theta_0)}{C_0} = \frac{\sin(\theta_\alpha)}{C_\alpha} = A \quad \text{Eq. 6}$$

or $$\sin(\theta_\alpha) = A * C_\alpha \quad \text{Eq. 7}$$

It should be noted that where the hydrophone array is horizontal so that $\alpha=0$, EQUATION 6 can be extended backward into the "Design Layer" and establish the direct relationship between the intended angle and the beam angle any where within the water column. FIGS. 9A and 9C depict this relationship. If $\alpha=0$ in EQUATION 1, then:

$$\frac{\sin(\theta_d)}{C_d} = \frac{\sin(\theta_0)}{C_0} = \frac{\sin(\theta_\alpha)}{C_\alpha} = A$$

Examining EQUATIONS 6 and 7 reveal that a beam launched into the water at angle $\theta_0$ with a surface sound velocity (SSV) of velocity $C_0$ will travel through the remaining layers of the water column (where the velocity is actually $C_a$) at an angle of $\theta_a$, and that the angle of this beam anywhere within the water column is a function of the local sound velocity and the constant "A".

$$d\theta_\alpha = \frac{\partial \theta_\alpha}{\partial \theta_0} * d\theta_0 \frac{\partial \theta_\alpha}{\partial C_\alpha} * dC_\alpha + \frac{\partial \theta_\alpha}{\partial \theta_0} * dC_0 \quad \text{Eq. 8}$$

Partial differentiation of EQUATION 6 to find the sensitivities required by EQUATION 8 gives them as:

$$\frac{\partial \theta_\alpha}{\partial C_\alpha} = \frac{A}{\cos(\theta_\alpha)}, \quad \text{Eq. 9}$$

$$\frac{\partial \theta_\alpha}{\partial C_0} = -\frac{C_\alpha}{C_0} * \frac{A}{\cos(\theta_\alpha)}, \text{ and} \quad \text{Eq. 10}$$

$$\frac{\partial \theta_\alpha}{\partial \theta_0} = \frac{C_\alpha}{C_0} * \frac{\cos(\theta_0)}{\cos(\theta_\alpha)}. \quad \text{Eq. 11}$$

Placing these sensitivities into EQUATION 8 gives the angular error of the beam through the water column as:

$$d\theta_\alpha = \frac{C_\alpha}{C_0} * \frac{\cos(\theta_0)}{\cos(\theta_\alpha)} * d\theta_0 + \frac{A}{\cos(\theta_\alpha)} * \quad \text{Eq. 12}$$
$$dC_\alpha - \frac{C_\alpha}{C_0} * \frac{A}{\cos(\theta_\alpha)} * dC_0$$

Rearranging the terms of EQUATION 12 yields:

$$d\theta_\alpha = \frac{A * C_\alpha}{\cos(\theta_\alpha)} * \left( \frac{dC_\alpha}{C_\alpha} - \frac{dC_0}{C_0} \right) + \quad \text{Eq. 13}$$
$$\frac{C_\alpha}{C_0} * \frac{\cos(\theta_0)}{\cos(\theta_\alpha)} * d\theta_0$$

Substitution (from EQUATION 6) of:

$$A = \frac{\sin(\theta_\alpha)}{C_\alpha} \text{ and } \frac{C_\alpha}{C_0} = \frac{\sin(\theta_0)}{\sin(\theta_\alpha)} \text{ yeilds} \quad \text{Eq. 14}$$

$$d\theta_\alpha = \tan(\theta_\alpha) * \left( \frac{dC_\alpha}{C_\alpha} - \frac{dC_0}{C_0} + \frac{d\theta_0}{\tan(\theta_0)} \right)$$

Since $d\theta_0 = \tan(\theta_0 - \alpha) * \frac{dC_0}{C_0}$ (Equation 5), then $\quad \text{Eq. 15}$ $$d\theta_\alpha = \tan(\theta_\alpha) * \left( \frac{dC_\alpha}{C_\alpha} + \frac{dC_0}{C_0} * \left( \frac{\tan(\theta_0 - \alpha)}{\tan(\theta_0)} - 1 \right) \right)$$

Having defined the relationship of sound velocity errors and the angular error of the beam, the sensitivity of depth errors to sound velocity profile and beam angle errors may be defined. Considering that:

$$Z = \frac{T * C_\alpha}{2} * \cos(\theta_\alpha), \quad \text{Eq. 16}$$

where "T" is the two way travel time of the signal in the water, the sensitivities of Z to errors in beam angle and the sound velocity profile are defined as $$\frac{\partial Z}{\partial \theta_\alpha} = -\frac{T * C_\alpha}{2} * \sin(\theta_\alpha), \text{ and} \qquad \text{Eq. 17}$$

$$\frac{\partial Z}{\partial C_\alpha} = \frac{T}{2} * \cos(\theta_\alpha). \qquad \text{Eq. 18}$$

If the travel time is precisely known, then the total depth error, Z, is:

$$dZ = \frac{\partial Z}{\partial \theta_\alpha} = d\theta_\alpha + \frac{\partial Z}{\partial C_\alpha} * dC_\alpha \qquad \text{Eq. 19}$$

Substitution of EQUATIONS 17 and 18 into EQUATION 19 yields the relationship of EQUATION 20:

$$dZ = -\frac{T * C_\alpha}{2} * \sin(\theta_\alpha) * \tan(\theta_\alpha) * \qquad \text{Eq. 20}$$

$$\left( \frac{dC_\alpha}{C_\alpha} + \frac{dC_0}{C_0} * \left( \frac{\tan(\theta_0 - \alpha)}{\tan(\theta_0)} - 1 \right) \right) + \frac{T}{2} * \cos(\theta_\alpha) * dC_\alpha$$

Rearrangement of terms gives the depth error as:

$$dZ = \frac{T * C_\alpha}{2} * \cos(\theta_\alpha) * \qquad \text{Eq. 21}$$

$$\left( \frac{dC_\alpha}{C_\alpha} - \tan(\theta_\alpha)^2 * \left( \frac{dC_\alpha}{C_\alpha} - \frac{dC_0}{C_0} + \frac{d\theta_0}{\tan(\theta_0)} \right) \right)$$

Replacing:

$$\frac{T * C_\alpha}{2} * \cos(\theta_\alpha)$$

with Z (EQUATION 16) and dividing both sides by Z provides the proportional depth error as:

$$\frac{dZ}{Z} = (1 - \tan(\theta_\alpha)^2) * \frac{dC}{C_\alpha} + \tan(\theta_\alpha)^2 * \left( \frac{dC_0}{C_0} - \frac{d\theta_0}{\tan(\theta_0)} \right) \qquad \text{Eq. 22}$$

Substitution for $d\theta_0$ from EQUATION 5 gives:

$$\frac{dZ}{Z} = (1 - \tan(\theta_\alpha)^2) * \qquad \text{Eq. 23}$$

$$\frac{dC_\alpha}{C_\alpha} + \tan(\theta_\alpha)^2 * \left( \frac{dC_0}{C_0} - \frac{\tan(\theta_0 - \alpha)}{\tan(\theta_0)} * \frac{dC_0}{C_0} \right)$$

After rearrangement of terms, it is seen that:

$$\frac{dZ}{Z} = \qquad \text{Eq. 24}$$

$$(1 - \tan(\theta_\alpha)^2) * \frac{dC_\alpha}{C_\alpha} - \left( 1 - \frac{\tan(\theta_0 - \alpha)}{\tan(\theta_0)} \right) * \tan(\theta_\alpha)^2 * \frac{dC_0}{C_0}$$

For a horizontally mounted array ($\alpha=0$), EQUATION 24 simplifies to give the proportional depth error as:

$$\frac{dZ}{Z} = (1 - \tan^2(\theta_\alpha)) * \frac{dC_\alpha}{C_\alpha} \qquad \text{Eq. 25}$$

This provides a situation in which sound velocity related depth errors are proportional only to the water column velocity errors. No error will occur due to erroneous SSV data.

For arrays where $\alpha$ is not equal to zero, erroneous SSV data may cause depth errors to occur. This is shown by EQUATION 26.

$$\frac{dZ}{Z} = \qquad \text{Eq. 26}$$

$$(1 - \tan(\theta_\alpha)^2) * \frac{dC_\alpha}{C_\alpha} - \left( 1 - \frac{\tan(\theta_0 - \alpha)}{\tan(\theta_0)} \right) * \tan(\theta_\alpha)^2 * \frac{dC_0}{C_0}$$

For a broadside beam ($\alpha=\theta_0$ in FIG. 9C), the depth error simplifies to:

$$\frac{dZ}{Z} = (1 - \tan(\theta_\alpha)^2) * \frac{dC_\alpha}{C_\alpha} - \tan(\theta_\alpha)^2 * \frac{dC_0}{C_0} \qquad \text{Eq. 27}$$

Various preferred embodiments of the present invention have been described. It is understood, however, that changes and modifications may be made without departing from the true scope and spirit of the present invention as defined by the following claims. For example, it should be noted that the present invention may be implemented and practiced in numerous permutations and situations for correcting or reducing sound velocity and roll bias errors.

Further, it should be noted that the present invention may be implemented and practiced in connection with numerous types or forms of sonar systems. In addition, the present invention may be implemented using numerous types of transmitter and receiver array configurations including those disclosed in Lustig et al., U.S. Pat No. 3,114,631; many variations, modifications and improvements of those transmitter and receiver configurations are also suitable.

Furthermore, the present invention may be implemented in numerous manners of bottom topographic mapping, depth sounding (bathymetry); object location; sub-bottom profiling; underwater imaging for inspection purposes; and buried-pipeline location. Moreover, the present invention may be implemented in a submarine in which case computation of bathymetric data would factor in the depth of the submarine.

Finally, it should be noted that many equations or relationships may be employed to calculate the sound velocity, sound velocity profile, sound velocity gradient, bathymetric data and/or the echo time at a given locale, whether or not remote from the vertical, while implementing the present invention.

What is claimed is:

1. A method of calculating roll bias data which is representative of differences in attitude between an array of sensors of a sensing system on a vessel and an attitude sensing system, having at least one sensor, on the vessel, wherein the attitude sensing system measures the attitude of the vessel in the roll axis, said method comprising:

measuring first bathymetric data at a first locale at time $t_1$ using a first beam projected at the first locale at a substantially 45° angle from the vertical of the array;

measuring second bathymetric data at the first locale at a time $t_2$ using a second beam projected at substantially the same angle from the vertical of the array as the first beam from the opposite side of the vessel;

calculating roll bias data by comparing the first and second bathymetric data at the first locale.

2. The method of claim 1 further including the step of calculating a roll bias correction factor using the roll bias data.

3. The method of claim 1 further including subtracting a difference in tide at the first locale between time $t_1$ and time $t_2$.

4. The method of claim 3 further including calculating a difference in tide at a second locale by measuring bathymetric data at a second locale at about time $t_1$ using a first beam projected at a substantially 45° angle from the vertical of the array; and measuring bathymetric data at the second locale at about time $t_2$ using a second beam projected from the same side of the vessel at substantially the same angle from the vertical of the array as the first beam wherein the second locale is on the same sounding strip as the first locale.

5. The method of claim 4 further including calculating a difference in tide at a third locale by measuring bathymetric data at the third locale at time $t_3$ using a third beam projected at a substantially 45° angle from the vertical of the array; and measuring bathymetric data at the third locale at time $t_4$ using a fourth beam projected from the same side of the vessel and at substantially the same angle from the vertical of the array as the first beam wherein the third locale is on a different sounding strip than the first locale.

6. The method of claim 5 wherein the difference in the tide at a first locale is an average of the difference in the tide at the second and third locales.

7. The method of claim 5 further including subtracting differences in a draft of the vessel at the first locale between time $t_1$ and time $t_2$.

8. A method of calculating roll bias data which is representative of the differences in attitude between an array of sensors of a sensing system on a vessel and an attitude sensing system, having at least one attitude sensor, on the vessel wherein the attitude sensing system measures the attitude of the vessel in the roll axis, said method comprising:

measuring first bathymetric data at a first locale at time $t_1$ using a first beam projected at the first locale at a first angle;

measuring second bathymetric data at the first locale at a time $t_2$ using a second beam projected from the opposite side of the vessel at the first locale at an angle substantially equal to the first angle; and calculating roll bias data by comparing the first and second bathymetric data.

9. The method of claim 8 further including the step of calculating a roll bias correction factor using the roll bias data.

10. The method of claim 8 further including subtracting a difference in the tide at first locale between time $t_1$ and time $t_2$.

11. The method of claim 10 further including calculating the difference in tide at a second locale by measuring bathymetric data at a second locale at about time $t_1$ using a third beam projected at the second locale; and measuring bathymetric data at the second locale at about time $t_2$ using a fourth beam projected from the same side of the vessel at the second locale wherein the second locale is on the same sounding strip as the first locale.

12. The method of claim 11 further including calculating a difference in tide at a third locale by measuring bathymetric data at the third locale at time $t_3$ using a fifth beam projected at the third locale; and measuring bathymetric data at the third locale at time $t_4$ using a sixth beam projected from the same side of the vessel at the third locale wherein the third locale is on a different sounding strip as the first and second locales.

13. The method of claim 12 wherein the difference in the tide at a first locale is an average of the difference in tide at the second and third locales.

14. A system for calculating roll bias data which is representative of the differences in attitude between an array of sensors of a sensing system on a vessel and an attitude sensing system, wherein the attitude sensing system includes at least one sensor on the vessel for measuring the attitude of the vessel in the roll axis, said system comprising:

means for measuring first bathymetric data at a first locale at time t using a first beam projected at the first locale at a substantially 45° angle from the vertical of the array;

means for measuring second bathymetric data at the first locale at a time $t_2$ using a second beam projected from the opposite side of the vessel at substantially the same angle as the first beam;

means for calculating roll bias data by comparing the first and second bathymetric data at the first locale.

15. The system of claim 14 wherein the means for calculating roll bias data further includes means for calculating a roll bias correction factor using the roll bias data.

16. The system of claim 14 wherein the means for calculating roll bias data further includes means for subtracting a difference in tide at the first locale between time $t_1$ and time $t_2$.

17. The system of claim 16 further including:

means for calculating a difference in tide at a second locale by measuring bathymetric data at a second locale at about time $t_1$ using a third beam projected at a substantially 45° angle from the vertical of the array; and means for measuring bathymetric data at the second locale at about time $t_2$ using a beam projected from the same side of the vessel and at substantially the same angle from the vertical of the array as the third beam wherein the second locale is on the same sounding strip as the first locale.

18. The system of claim 17 further including:

means for calculating a difference in tide at a third locale by measuring bathymetric data at the third locale at time $t_3$ using a third beam projected at a substantially 45° angle from the vertical of the array; and means for measuring bathymetric data at the third locale at time $t_4$ using a fourth beam projected from the same side of the vessel at substantially the same angle from the vertical of the array as the third beam wherein the third locale is on a different sounding strip than the first and second locales.

19. The system of claim 17 further including means for subtracting differences in a draft of the vessel at the first locale between time $t_1$ and time $t_2$.

20. A system for calculating roll bias data which is representative of the differences in attitude between an array of sensors of a sensing system on a vessel and an attitude sensing system on a vessel, wherein the attitude sensing system includes at least one sensor for measuring the attitude of the vessel in the roll axis, said system comprising:

means for measuring first bathymetric data at a first locale at time $t_1$ using a first beam projected at the first locale at a first angle;

means for measuring second bathymetric data at the first locale at a time $t_2$ using a second beam projected at the first locale from the opposite side of the vessel and at substantially the same angle as the first angle;

means for calculating roll bias data by comparing the first and second bathymetric data.

21. The system of claim 20 further including means for calculating a roll bias correction factor using the roll bias data.

22. The system of claim 20 further including means for subtracting difference in tide at the first locale between time $t$ and time $t_2$.

23. The system of claim 22 further including:
   means for calculating a difference in tide at a second locale by measuring bathymetric data at a second locale at about time $t_1$ using a third beam projected at the second locale; and
   means for measuring bathymetric data at the second locale at about time $t_2$ using another beam projected at the second locale from the same side of the vessel as the third beam wherein the second locale is on the same sounding strip as the first locale.

24. The system of claim 23 further including:
   means for calculating the difference in tide at a third locale by measuring bathymetric data at the third locale at time $t_3$ using a fourth beam projected at the third locale; and
   means for measuring bathymetric data at the third locale at time $t_4$ using a fifth beam projected at the third locale from the same side of the vessel as the fourth beam wherein the third locale is on a different sounding strip than the first and second locales.

25. The system of claim 24 wherein the means for calculating the difference in tide at the first locale calculates the difference in tide at the first locale by averaging the difference in tide at the second and third locales.

* * * * *